US012611594B2

(12) United States Patent
Hauge, Jr.

(10) Patent No.: US 12,611,594 B2
(45) Date of Patent: Apr. 28, 2026

(54) STEERING CONTROL ASSEMBLY

(71) Applicant: Curtis L. Hauge, Jr., Cambridge, MN (US)

(72) Inventor: Curtis L. Hauge, Jr., Cambridge, MN (US)

( * ) Notice: Subject to any disclaimer, the term of this patent is extended or adjusted under 35 U.S.C. 154(b) by 198 days.

(21) Appl. No.: 18/756,551

(22) Filed: Jun. 27, 2024

(65) Prior Publication Data

US 2026/0000973 A1      Jan. 1, 2026

(51) Int. Cl.
*A63F 13/245*          (2014.01)
*A63F 13/803*          (2014.01)

(52) U.S. Cl.
CPC .......... *A63F 13/245* (2014.09); *A63F 13/803* (2014.09)

(58) Field of Classification Search
CPC ...... A63F 13/24; A63F 13/245; A63F 13/803; A63F 2300/1043; A63F 2300/1062; A63F 2300/8017; G09B 9/04
See application file for complete search history.

(56) References Cited

U.S. PATENT DOCUMENTS

| | | | | | |
|---|---|---|---|---|---|
| 3,572,067 | A | * | 3/1971 | Kimberlin | ......... B60R 25/02142 |
| | | | | | 70/252 |
| 5,056,787 | A | | 10/1991 | Mitsuyoshi | |
| 5,829,745 | A | | 11/1998 | Houle | |
| 5,868,573 | A | * | 2/1999 | Kerby | .................. A63F 13/245 |
| | | | | | 434/62 |
| 5,989,123 | A | * | 11/1999 | Tosaki | .................. A63F 13/803 |
| | | | | | 463/47 |
| 6,020,875 | A | | 2/2000 | Moore | |
| 6,203,432 | B1 | * | 3/2001 | Roberts | ................. A63F 13/803 |
| | | | | | 463/36 |
| 6,279,906 | B1 | | 8/2001 | Sanderson | |
| 6,283,859 | B1 | | 9/2001 | Carlson | |
| 6,976,677 | B1 | * | 12/2005 | McVicar | ................. A63F 13/42 |
| | | | | | 463/47 |
| 7,086,949 | B2 | * | 8/2006 | McVicar | ............... A63F 13/803 |
| | | | | | 463/36 |
| 7,198,269 | B2 | | 4/2007 | Burgel | |
| 7,775,884 | B1 | * | 8/2010 | McCauley | ............ A63F 13/335 |
| | | | | | 463/39 |
| 8,088,005 | B2 | | 1/2012 | Burgel | |
| 8,672,758 | B2 | | 3/2014 | Jaouen | |
| 2001/0021667 | A1 | * | 9/2001 | Fujimoto | .............. A63F 13/245 |
| | | | | | 463/36 |
| 2001/0046897 | A1 | * | 11/2001 | Hagiwara | ............. A63F 13/245 |
| | | | | | 463/37 |

(Continued)

*Primary Examiner* — Milap Shah

(57)          ABSTRACT

A steering control assembly for enabling control of multiple types of game vehicles includes a receiving unit and a steering column. The receiving unit is mountable within a cabinet of an arcade machine. An interface is operationally engaged an axle assembly of the receiving unit can be communicatively engaged to a control unit of the arcade machine. The steering column is operationally engageable to the axle assembly so that rotation of the steering column actuates the interface to signal the control unit. A grasp is attached to and extends laterally from the steering column. A selector is attached to one of the grasp and the steering column, is operationally engaged to the axle assembly, and allows a user to actuate the axle assembly so that rotation of the steering column either is unlimited, is restricted, or is biased to return to a preset position.

19 Claims, 17 Drawing Sheets

(56) References Cited

U.S. PATENT DOCUMENTS

| | | | |
|---|---|---|---|
| 2002/0142838 A1* | 10/2002 | Russell | A63F 13/20 463/36 |
| 2004/0224766 A1* | 11/2004 | Burgel | A63F 13/245 463/37 |
| 2006/0258452 A1* | 11/2006 | Hsu | A63F 13/245 463/36 |
| 2011/0065067 A1 | 3/2011 | Tanaka | |
| 2011/0256930 A1* | 10/2011 | Jaouen | A63F 13/803 463/37 |
| 2011/0281649 A1* | 11/2011 | Jaouen | A63F 13/803 463/36 |
| 2013/0137514 A1* | 5/2013 | Ichimura | A63F 13/90 463/31 |
| 2023/0094958 A1* | 3/2023 | Papis | A63F 13/245 273/148 B |

* cited by examiner

STEERING CONTROL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to arcade game input devices and more particularly pertains to a new arcade game input device enabling control of multiple types of game vehicles that are used in different video games.

(2) Description of Related Art Including Information Disclosed Under 37 CFR 1.97 and 1.98

The prior art relates to arcade game input devices for controlling vehicles in video games but which are not easily switchable between a variety of modes wherein the steering wheel, or other steering element, is biased to a preset position, is restricted in rotation, is free spinning, or is connected to a force feedback motor.

BRIEF SUMMARY OF THE INVENTION

An embodiment of the disclosure meets the needs presented above by generally comprising a receiving unit and a steering column. The receiving unit comprises a housing which is configured to be mounted within a cabinet of an arcade machine, typically using mounting hardware. An axle assembly is attached to and is positioned within the housing. An interface is operationally engaged to the axle assembly and is configured to be communicatively engaged to a control unit of the arcade machine. The steering column is selectively engageable to the axle assembly. Thus, rotation of the steering column actuates the interface to signal the control unit. A grasp is attached to and extends laterally from a second end of the steering column. The grasp is configured to be grasped in one or both hands of a user, enabling the user to rotate the steering column. A selector is attached to one of the grasp and the steering column, is operationally engaged to the axle assembly, and is configured to be selectively manipulated by a user to actuate the axle assembly in a respective one of a plurality of steering modes. Each steering mode corresponds to a rotational mode of the steering column, wherein rotation of the steering column either is unlimited (free spinning), restricted and biased to return to a preset position upon release of the grasp, or resisted.

Another embodiment of the disclosure is an arcade machine system, which comprises an arcade machine that includes a steering control assembly. A control unit, which is programmed to execute a plurality of video games, is attached to and is positioned within a cabinet of the arcade machine. A display and a speaker are attached to the cabinet and are operationally engaged to the control unit. A front panel is hingedly attached to the top of the cabinet and extends downwardly into a cutout in a front wall of the cabinet. The front panel is selectively positionable in stowed and deployed configurations. Front switches attached to the front panel allow entry of commands into the control unit. The arcade machine system includes a steering control assembly, according to the disclosure above. A receiving unit of the steering control assembly, described above, is mounted to a rear face of the front panel and its interface is communicatively engaged to the control unit. A user can selectively manipulate a selector of the steering control assembly to actuate the axle assembly in a respective one of a plurality of steering modes. Each steering mode corresponds to a rotational mode of the steering column, wherein rotation of the steering column either is unlimited (free spinning), restricted and biased to return to a preset position upon release of the grasp, or resisted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
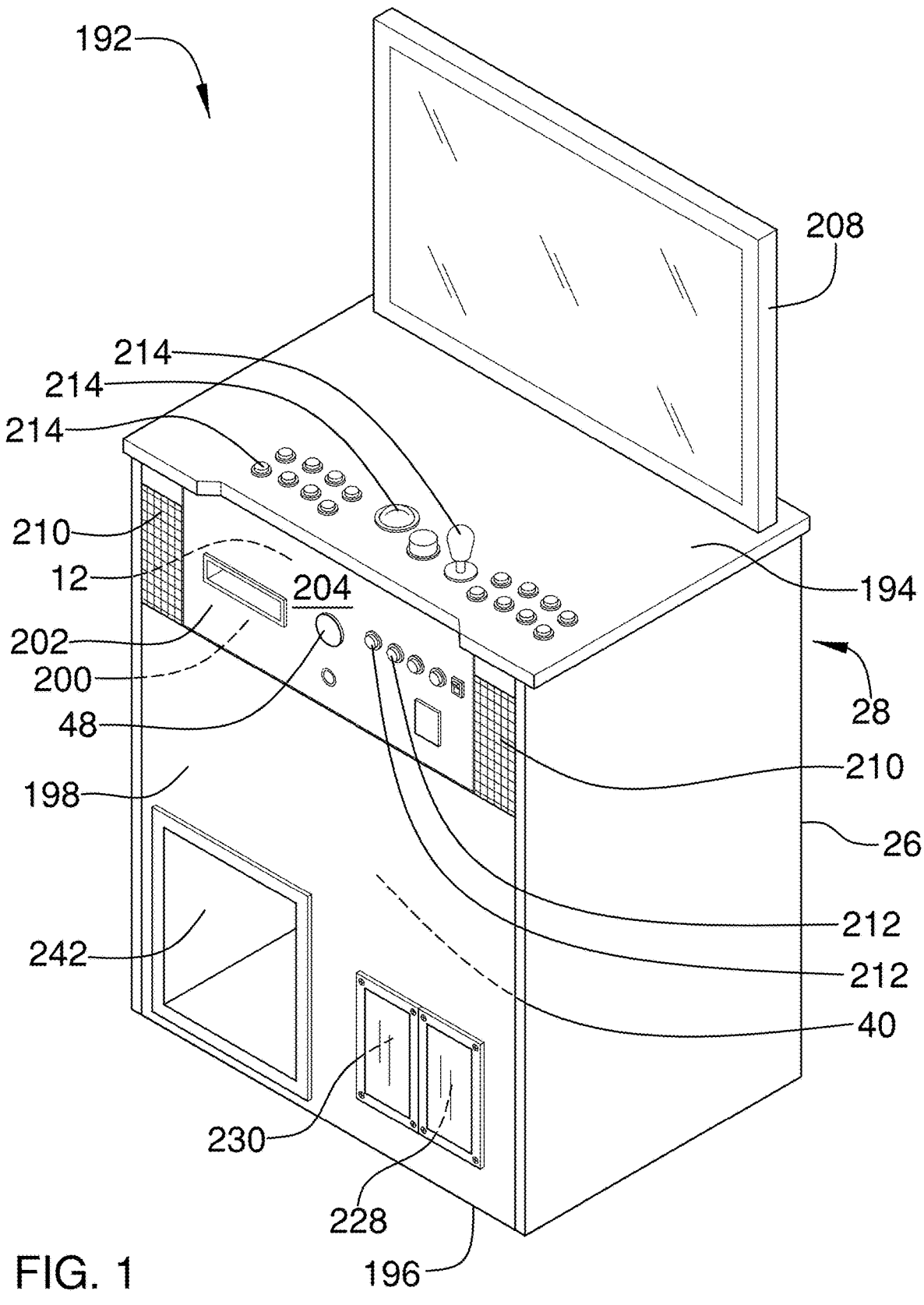
FIG. 1 is an isometric perspective view of a steering control assembly according to an embodiment of the disclosure.

With reference now to the drawings, and in particular to FIGS. 1 through 18 thereof, a new arcade game input device embodying the principles and concepts of an embodiment of the disclosure and generally designated by the reference numeral 10 will be described.

As best illustrated in FIGS. 1 through 18, the steering control assembly 10 generally comprises a receiving unit 12, a steering column 14, a grasp 16, and a selector 18. The receiving unit 12 comprises a housing 20, an axle assembly 22, and an interface 24. The housing 20 is configured to be mounted within a cabinet 26 of an arcade machine 28. The mounting typically would be achieved by insertion of a respective article of mounting hardware (not shown) into each mounting hole 30 of a plurality of mounting holes 30 that is positioned in the housing 20. Other methods of mounting the housing 20 to the cabinet 26 also are anticipated, such as, but not limited to, mounting brackets, welding, or the like.

The axle assembly 22 is attached to and is positioned within the housing 20. The axle assembly 22 comprises a pipe 32, which has a first end 34 and a second end 36, and a linkage 38, which is slidably attached to and positioned within the pipe 32. The linkage 38 corotates with the pipe 32 and is selectively positionable in a first configuration, a second configuration, and a third configuration. In the first configuration (FIG. 14), restricted rotation of the steering column 14 is allowed and the steering column 14 returns to the preset position upon release of the grasp 16. In the second configuration (FIG. 15), unlimited rotation of the steering column 14 is allowed. In the third configuration (FIG. 16) rotation of the steering column 14 is resisted.

The interface 24 is operationally engaged to the axle assembly 22 and is configured to communicatively engage a control unit 40 of the arcade machine 28. Typically, the interface 24 would be engaged to the control unit 40 by a set of connectors (wires shown in the figures) but wireless communication between the interface 24 and the control unit 40 also is anticipated.

Figure 11:
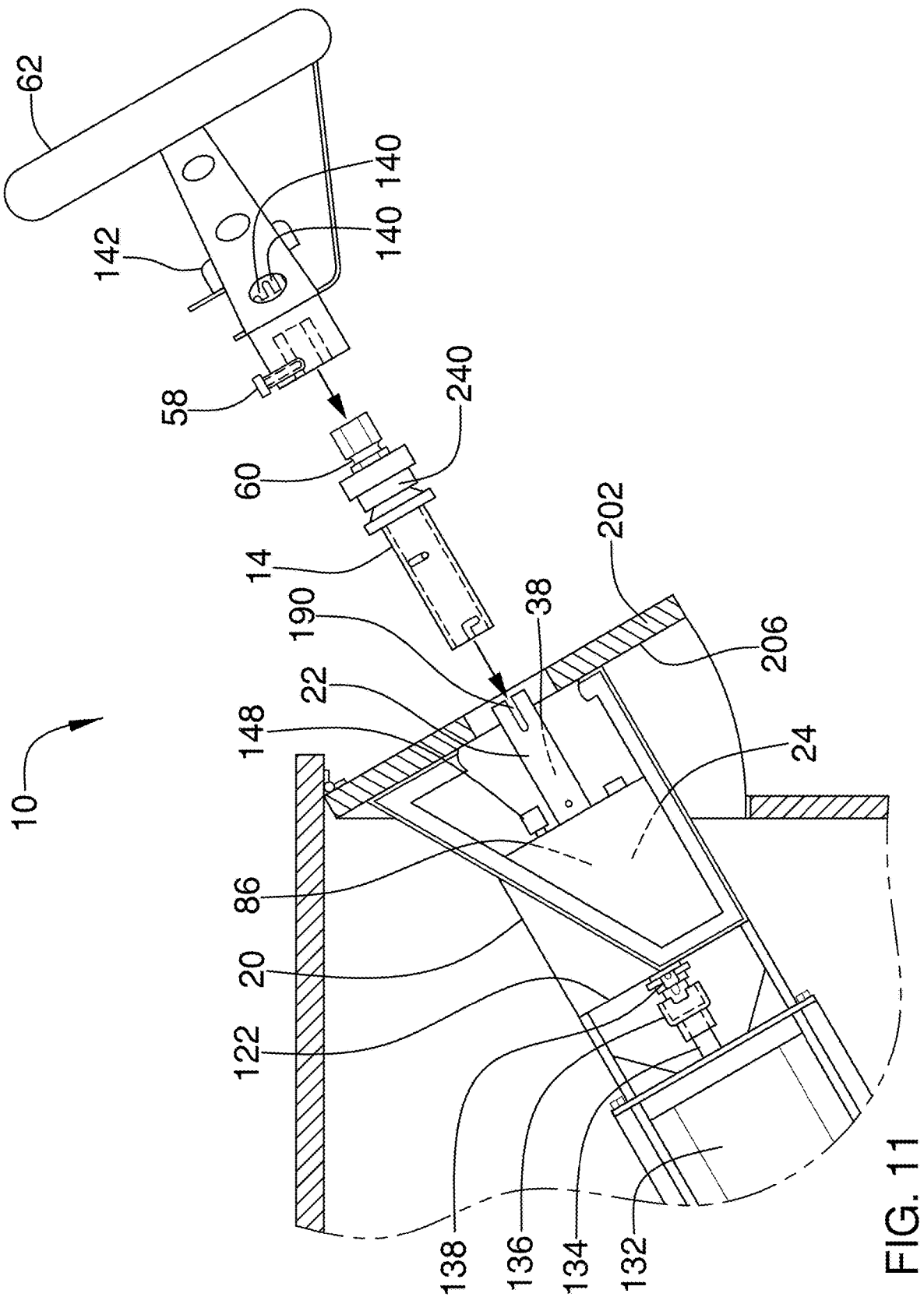
FIG. 11 is a cross-sectional view of an embodiment of the disclosure.
Figure 12:
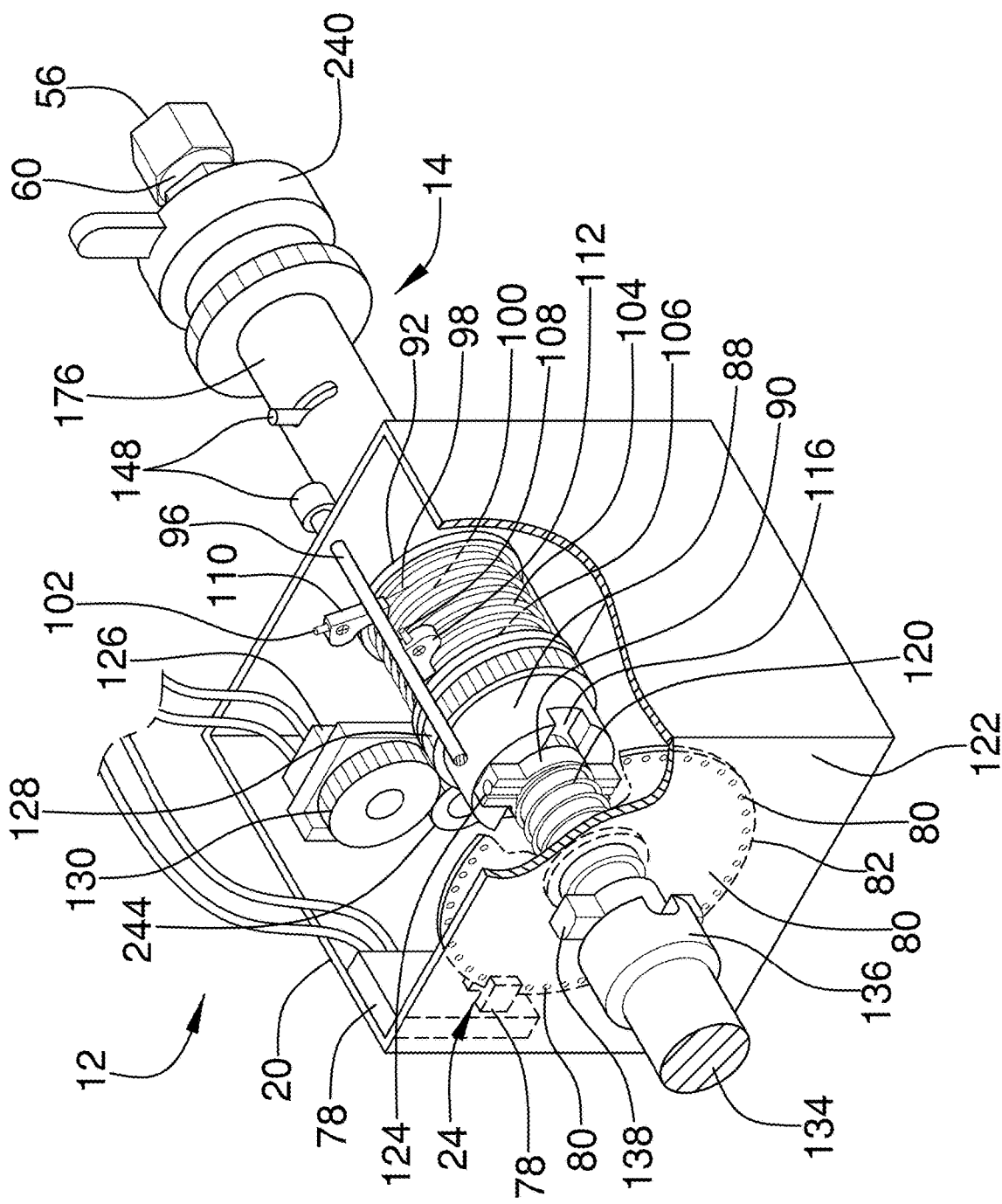
FIG. 12 is an isometric perspective view of an embodiment of the disclosure.

The steering column 14 has a first end 42 and a second end 44. The steering column 14 is selectively and operationally engageable to the axle assembly 22 so that rotation of the steering column 14 actuates the interface 24 to signal the control unit 40. As is shown in FIG. 11, the steering column 14 is operationally engaged to the axle assembly 22 by insertion of its first end 42 through a column opening 46 in the cabinet 26. An opening cover 48 may be included and would be attachable to the cabinet 26 to close the column opening 46 when not in use.

The grasp 16 is attached to and extends laterally from the second end 44 of the steering column 14 and is configured to be grasped in one or both hands of a user to rotate the steering column 14. The grasp 16 comprises a first coupler 50, which is complementary to a second coupler 52 that is attached to the second end 44 of the steering column 14. The first coupler 50 is selectively couplable to the second coupler 52 to removably attach the grasp 16 to the steering column 14.

Figure 9:
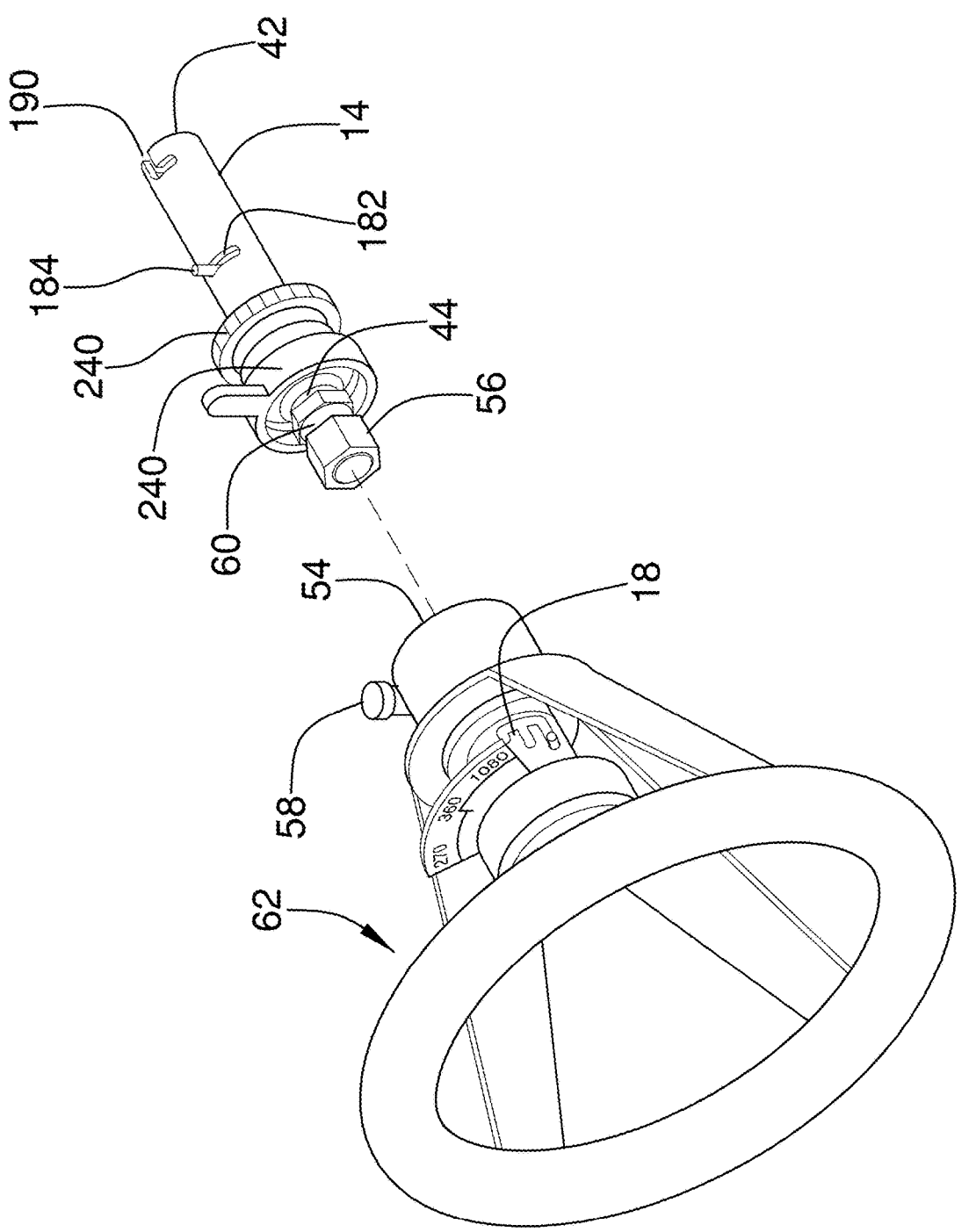
FIG. 9 is an exploded view of an embodiment of the disclosure.
Figure 10:
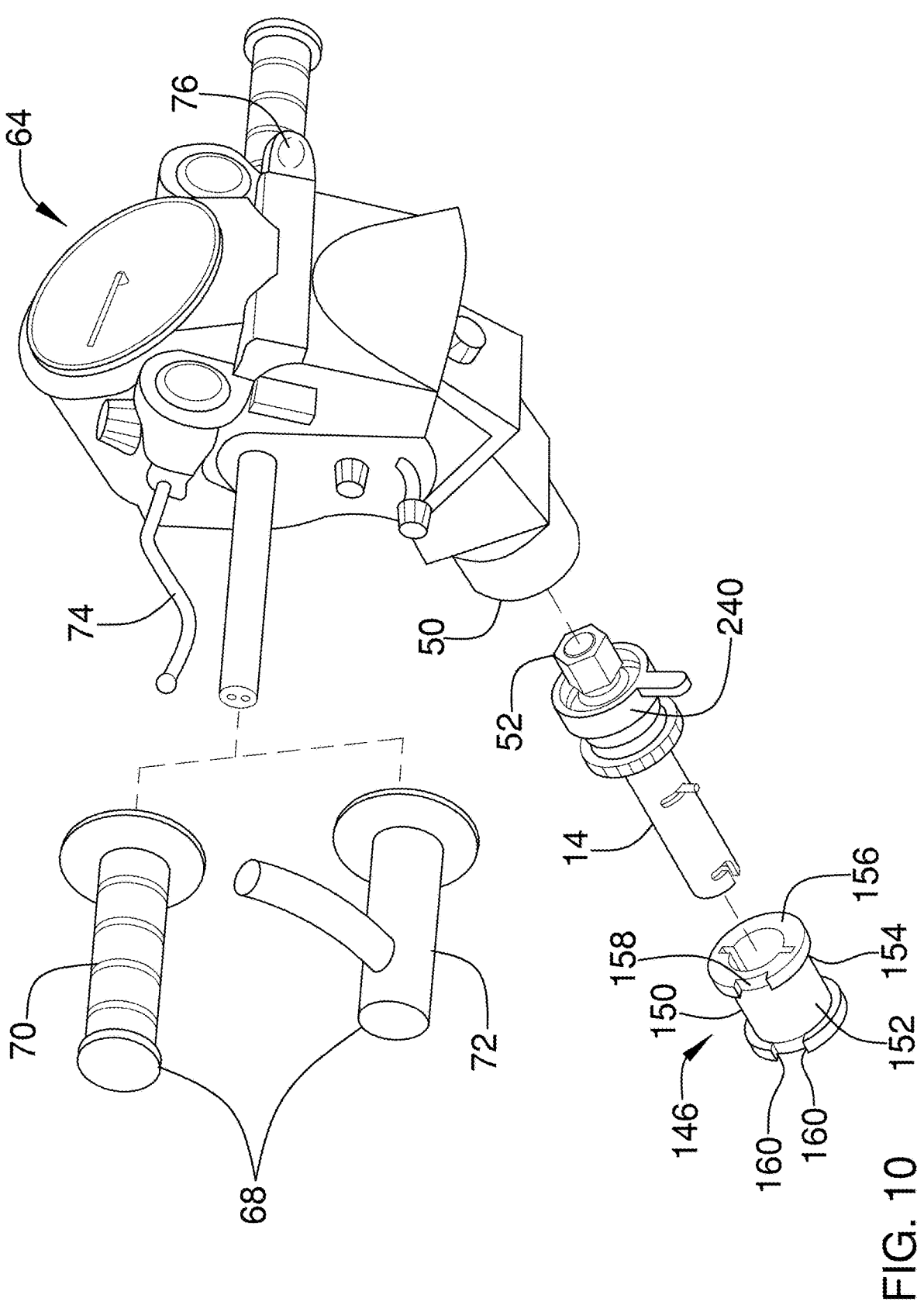
FIG. 10 is an exploded view of an embodiment of the disclosure.

As is shown in FIGS. 9-11, the first coupler 50 and the second coupler 52 may comprise a socket 54 and a fixed nut 56, respectively, or other coupling means well known to those skilled in the art of detachable columns, such as, but not limited to cam locks, twist locks, and the like. The present invention anticipates a spring-loaded locking pin 58 being attached to the socket 54 and insertable into an annular groove 60 that is adjacent to the fixed nut 56, as is shown in FIG. 11. Such quick connecting steering columns utilizing hubs 240 (see FIG. 17 for an exploded view) are used in the race car industry and are well known to those skilled in the art. Due to intentional loose fit in their design, these hubs 240 also may comprise a compression spring assembly or an adjustable locking device to prevent wobbling.

The grasp 16 is one of a plurality of grasps 16 with each grasp 16 having a configuration that mimics a steering element of a respective vehicle. Thus, the plurality of grasps 16 comprises grasps 16 having configurations mimicking steering elements of a variety of vehicles, such as, but not limited to, cars, motorcycles, snowmobiles, jet skis, or the like, which may be the subjects of a particular video game. The plurality of grasps 16 may comprise a steering wheel 62 and a handlebar module 64, each being selectively attachable to the second end 44 of the steering column 14.

The handlebar module 64 extends bilaterally from the second end 44 of the steering column 14 upon its attachment. The handlebar module 64 would be used in video games having motorcycles, bicycles, snowmobiles, jet skis, or the like. The handlebar module 64 also may comprise a pivot joint 66, which is positioned proximate to the second end 44 of the steering column 14, so that the handlebar module 64 is selectively pivotable vertically and horizontally relative to the steering column 14. The present invention anticipates the vertical pivoting and the horizontal pivoting of the handlebar module 64 being selectable. Thus, the user could have neither, one, or both of the vertical pivoting and the horizontal pivoting of the handlebar module 64 enabled.

The present invention also anticipates a plurality of attachments 68 with the attachments 68 being selectively attachable to the handlebar module 64 to enable a variety of video games. For example, a naked grip 70 or a grip including a tank control arm 72, as are shown in FIG. 10, a yoke type grip (not shown), or the like. The handlebar module 64 may include a speedometer, a tachometer, or the like. Also anticipated is a brake lever 74, which is either attached to or removably attachable to the handlebar module 64, and a thumb throttle 76, which is attached to or removably attachable to the handlebar module 64. The brake lever 74 could be used in any games that require braking while the thumb throttle 76 could be used in video games that emulate All-Terrain Vehicles, snow machines, personal watercraft style vehicles, or the like.

The selector 18 is attached to one of the grasp 16 and the steering column 14, is operationally engaged to the axle assembly 22, and is configured to be selectively manipulated by a user to actuate the axle assembly 22 in a respective one of a plurality of steering modes. Each steering mode corresponds to a rotational mode of the steering column 14, wherein rotation of the steering column 14 is either unlimited (free spinning), restricted and biased to return to a preset position upon release of the grasp 16, or resisted.

Figure 14:
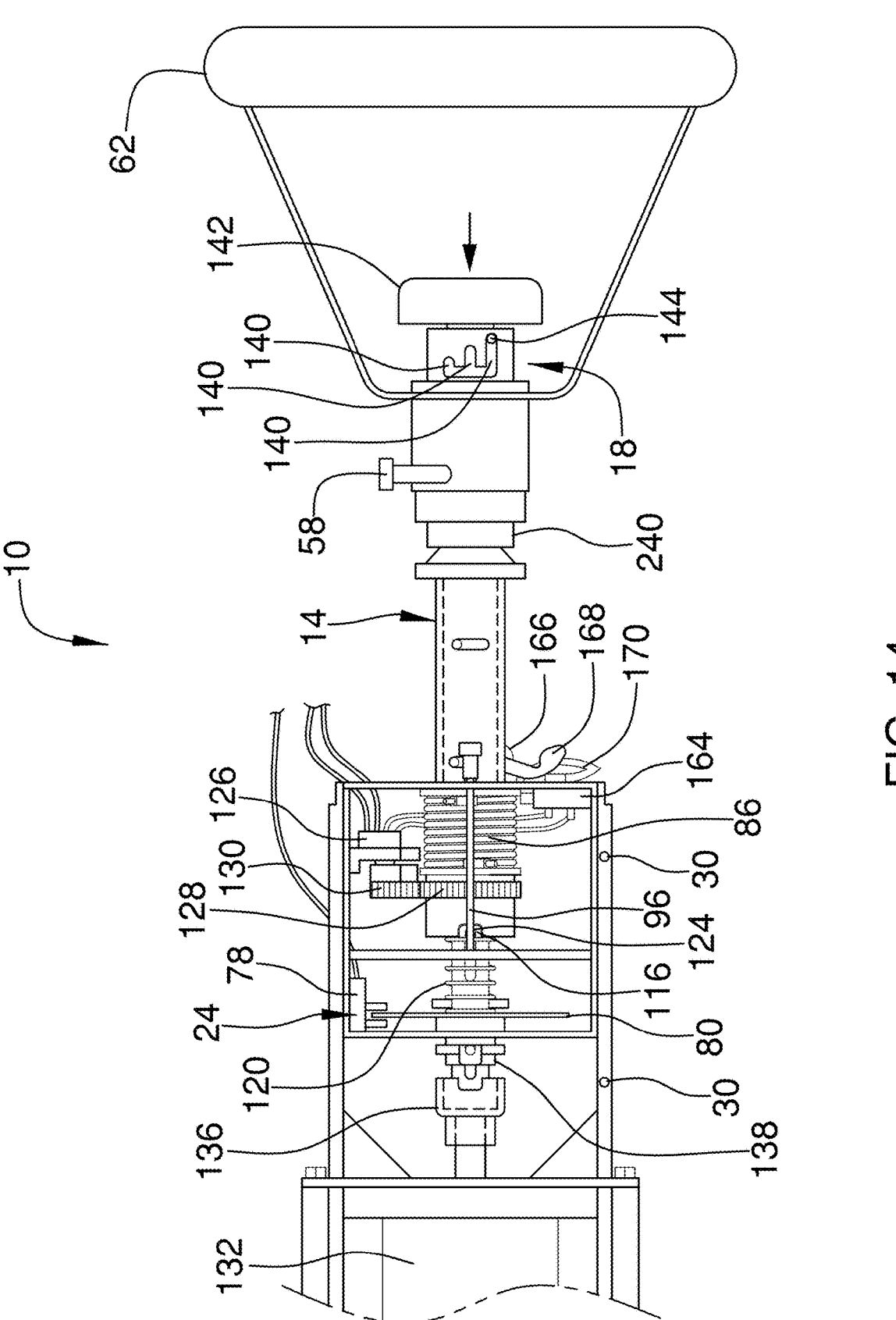
FIG. 14 is a side view of an embodiment of the disclosure.

The axle assembly 22 comprises a torque generator 86. In the first configuration of the linkage 38, as is shown in FIG. 14, the torque generator 86 is operationally engaged to the linkage 38 to generate torque upon rotation of the pipe 32 about its longitudinal axis, thereby inducing the steering column 14 to return to the preset position upon release of the grasp 16. The torque generator 86 may comprise a torque sleeve 88, which has a first end 90 and a second end 92. A protrusion 94 extends radially from the torque sleeve 88. The torque sleeve 88 is positioned around the pipe 32 and is engaged to the linkage 38 in the first configuration. As such the torque sleeve 88 corotates with the pipe 32 in the first configuration. A stop rod 96 is attached to the housing 20 and extends in parallel with the pipe 32. The protrusion 94 engages the stop rod 96 upon either clockwise rotation or counterclockwise rotation of the grasp 16 to restrict rotation of the steering column 14.

A left torque spring 98, which has a first terminus 100 and a second terminus 102, and a right torque spring 104, which has a first endpoint 106 and a second endpoint 108, are positioned around the torque sleeve 88. The first terminus 100 of the left torque spring 98 and first endpoint 106 of the right torque spring 104 are attached to the torque sleeve 88. Thus, with the torque sleeve 88 engaged to the linkage 38, the stop rod 96 is positioned to engage the left torque spring 98 proximate to its second terminus 102 to tension the left torque spring 98 upon counterclockwise rotation of the grasp 16. This causes the steering column 14 to return the preset position upon release of the grasp 16. Similarly, the stop rod 96 is positioned to engage the right torque spring 104 proximate to its second endpoint 108 upon clockwise rotation of the grasp 16. This tensions the right torque spring 104 and causes the steering column 14 to return the preset position upon release of the grasp 16.

Figure 13:
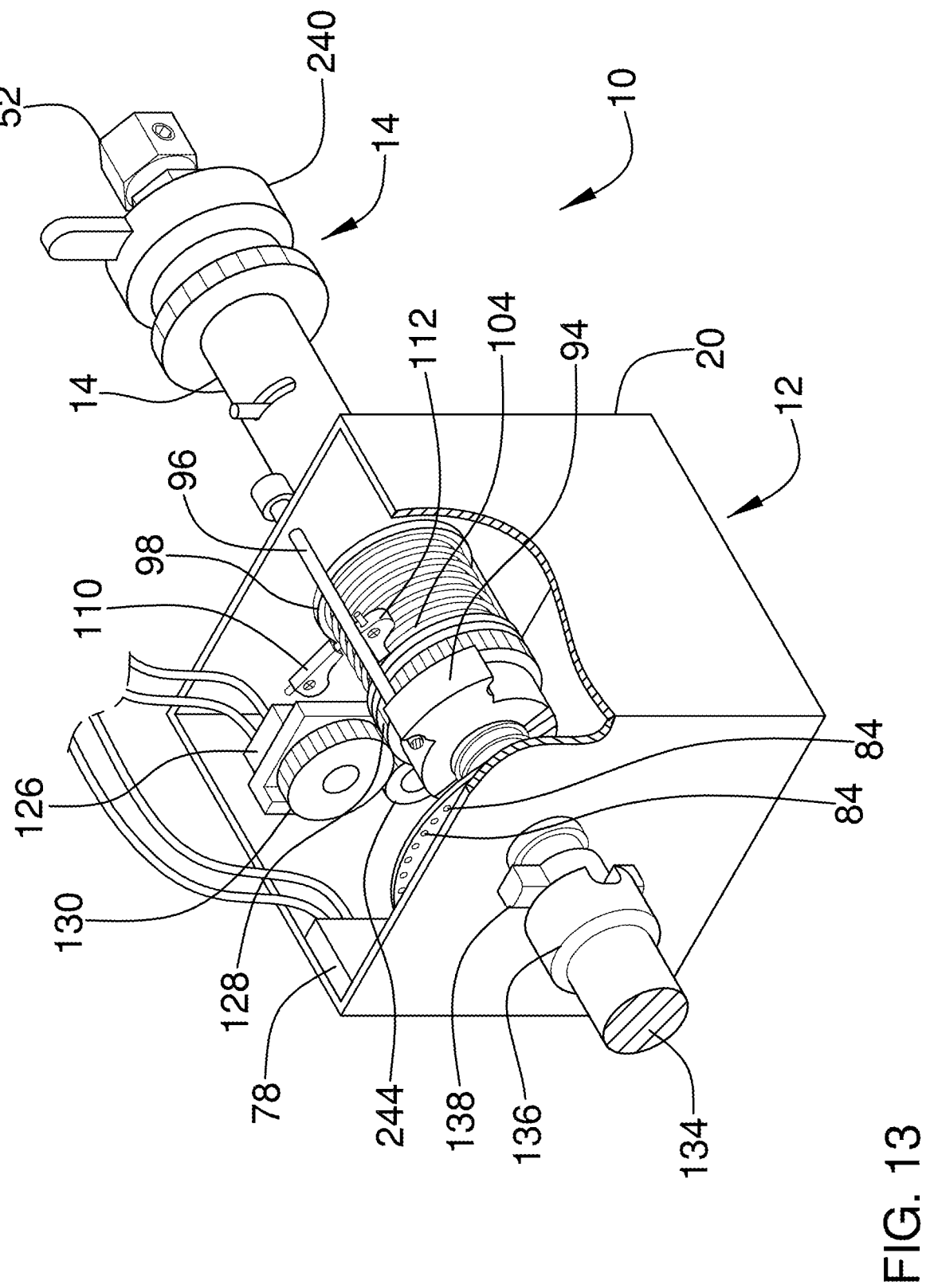
FIG. 13 is a side view of an embodiment of the disclosure.

As is shown in FIG. 13, a left pin 110 may be attached to the second terminus 102 of the left torque spring 98 and a right pin 112 may be attached to the second endpoint 108 of the right torque spring 104. The left pin 110 and the right pin 112 reduce noise as the left torque spring 98 and the right torque spring 104, respectively, contact the stop rod 96. The left pin 110 and the right pin 112, being wedge shaped, also allow for adjustment to center the grasp 16. For example, if the grasp 16 is not returning to center properly, it can be adjusted by sliding one of the left pin 110 and the right pin 112 upwardly or downwardly to contact the stop rod 96 with a slightly higher or lower degree, respectively, of spring tension applied.

The torque sleeve 88 is circumferentially smaller proximate to the second end 92 than the first end 90 and thus defines a ledge 114 within the torque sleeve 88. The first end 90 of the torque sleeve 88 has a pair of receiving slots 116 positioned therein. A locking collar 118 is attached to the pipe 32 and is positioned within the torque sleeve 88 so that the locking collar 118 abuts the ledge 114 and limits movement of the torque sleeve 88 along the pipe 32 while allowing the locking collar 118 and the pipe 32 to rotate within the torque sleeve 88 in the second configuration and the third configuration.

A set spring 120 is positioned around the pipe 32 proximate to a rear 122 of the housing 20. The set spring 120 is operationally engaged to the linkage 38 and is nontensioned in the first configuration. A pair of engagement pins 124 is attached to and extends bilaterally from the set spring 120 distal from the rear 122 of the housing 20. The pair of engagement pins 124 are positioned within the receiving slots 116 with the linkage 38 in the first configuration so that the torque sleeve 88 is operationally engaged to the pipe 32. The steering column 14 thus is biased to return to a preset position upon release of the grasp 16.

Figure 15:
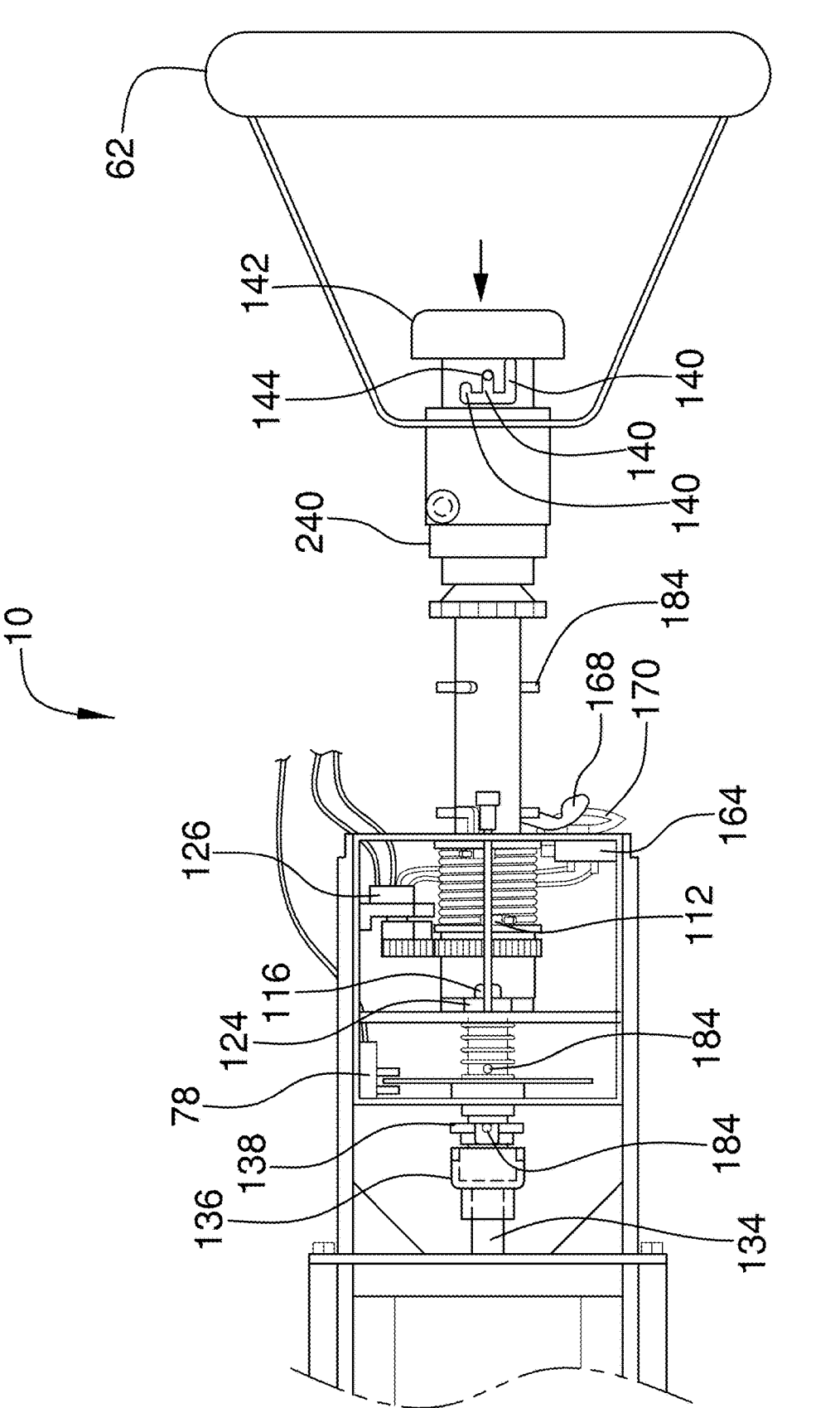
FIG. 15 is a side view of an embodiment of the disclosure.

The interface 24 comprises an optical reader 78, which is attached to and positioned within the housing 20. A disc 80 having a perimeter 82 is attached to the pipe 32. A plurality of slits 84 is positioned in the disc 80 and extends around the disc 80 proximate to the perimeter 82. The linkage 38 in the second configuration, as is shown in FIG. 15, is disengaged from the receiving slots 116, allowing unrestricted rotation of the steering wheel, while the disc 80 is being read by the optical reader 78 so that a number of slits 84 passing thereby is communicated to the control unit 40. The control unit 40 thus can determine a direction of rotation of the pipe 32 and calculate a number of rotations of the pipe 32, which is useful in video games wherein the grasp 16 is spun.

Figure 16:
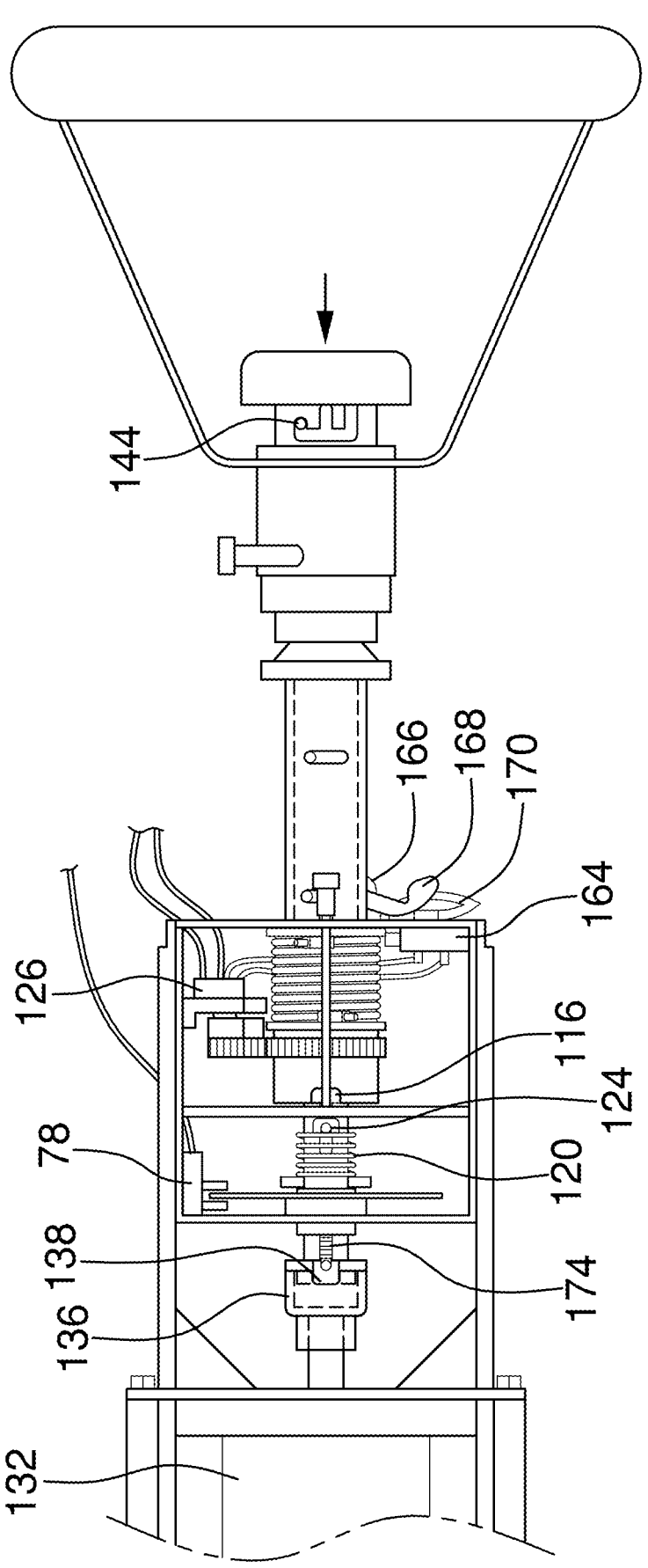
FIG. 16 is a partial cross-sectional view of an embodiment of the disclosure.

The interface 24 comprises a potentiometer 126 and the torque sleeve 88 comprises a cogwheel 128. A drive gear 130 is gearedly engaged to the cogwheel 128 and is operationally engaged to the potentiometer 126. With the linkage 38 in the first configuration, as is shown in FIG. 16, the cogwheel 128 rotates the drive gear 130 and the potentiometer 126 generates a voltage reading that corresponds to a degree of rotation of the steering column 14 that is communicated to the control unit 40 of the arcade machine 28.

The receiving unit 12 also may comprise a force feedback motor 132, which has a shaft 134. The force feedback motor 132 is mounted to the housing 20 so that the shaft 134 is colinear with the pipe 32. The force feedback motor 132 may be mounted externally to the housing 20, as is shown in FIG. 16. A first motor coupler 136 is attached to the shaft 134 and a second motor coupler 138 is attached to the linkage 38. With the linkage 38 in the third configuration, the second motor coupler 138 engages the first motor coupler 136 to operationally engage the pipe 32 to the force feedback motor 132, whereby rotation of the pipe 32 and the steering column 14 are resisted at a user selectable level. The force feedback motor 132 may be interfaced with the control unit 40 of the arcade machine 28.

The grasp 16 may have a set of three cam slots 140 positioned therein. The selector 18 may comprise a control knob 142, which is attached to the grasp 16 and which is operationally engaged to the linkage 38 upon attachment of the grasp 16 to the steering column 14. The control knob 142 is spring loaded. A pin 144 is attached to and extends from the control knob 142. Pushing the control knob 142 allows alignment of the pin 144 with a respective cam slot 140 of the set of three cam slots 140. Upon release of the control knob 142, the pin 144 locks into the respective cam slot 140 thereby positioning the linkage 38 in an associated one of the first configuration, the second configuration, and the third configuration.

The present invention anticipates the selector 18 comprises other selection means enabling manual or automated selection of a desired the steering mode. While the selector 18 depicted in FIGS. 14-16 is of a mechanical design, the selector 18 also may be substantially electrical and comprise switches, linear actuators, electric motors, and the like, in configurations that are well known to those skilled in the art of electrical actuators or those skilled in the art of linear actuators.

The steering control assembly 10 may include a rotation limiter 146, which is selectively attachable to the steering column 14 and which operationally engages the axle assembly 22 upon attachment of the steering column 14 to the pipe 32. A stop knob 148 is attached externally to and extends from the front of the housing 20. The rotation limiter 146 may comprise a tube 150, which has a first terminus 152 and a second terminus 154. The tube 150 is selectively positionable over the first end 42 of the steering column 14 with the first terminus 152 of the tube 150 being positioned adjacent to the first end 42 of the steering column 14. A stop ring 156 is attached to and extends radially from the first end of the tube 150. The stop ring 156 has a void 158 positioned therein with the stop knob 148 being positioned in the void 158 upon insertion of the steering column 14 into the column opening 46. Therefore, rotation of the steering column 14 is restricted by contact of the stop knob 148 with opposed edges 160 of the void 158.

The present invention anticipates the stop ring 156 having multiple voids 158 positioned therein, with each void 158 having a respective separation between its opposed edges 160. One void 158 may be sized so that rotation of the steering column 14 is completely prevented. The present invention also anticipates the stop ring 156 being one of a pair of stop rings 156, the stop rings 156 of which are attached singly to the first terminus 152 and a second terminus 154 of the tube 150. Each stop ring 156 would have a void 158, with the opposed edges 160 of one void 158 being separated more than the opposed edges 160 of the other void 158 and thus offering the user two different limited rotation options. The present invention also anticipates the tube 150 being one of a plurality of tubes 150, with each tube 150 having a stop ring 156 with a void 158 of a respective size.

With the steering control assembly 10 comprising a rotation limiter 146, the interface 24 also may comprise a three-terminal resistor 162, which is operationally engaged to the drive gear 130 via a cog gear 244. The cogwheel 128 rotates the cog gear 244 and the three-terminal resistor 162 generates a voltage reading corresponding to a degree of rotation of the steering column 14 that is communicated to the control unit 40 of the arcade machine 28.

A mode switch 164 is attached to the housing 20 and is operationally engaged to the potentiometer 126 and to the three-terminal resistor 162. The mode switch 164 selectively changes the source of the output of the interface 24 between the potentiometer 126 and the three-terminal resistor 162. In one configuration, the rotation limiter 146 makes contact with a restrictor wheel 166 so that an arm 168 extending from the restrictor wheel 166 pushes against the mode switch 164 to changing the source of the output of the interface 24 from the potentiometer 126 to the three-terminal resistor 162. A limiter spring 170 returns the restrictor wheel 166 to its default position when the steering column 14 and restrictor wheel 166 are disengaged from the pipe 32 concurrently with the mode switch 164 returning to its default position wherein data is sourced from the potentiometer 126.

Figure 17:
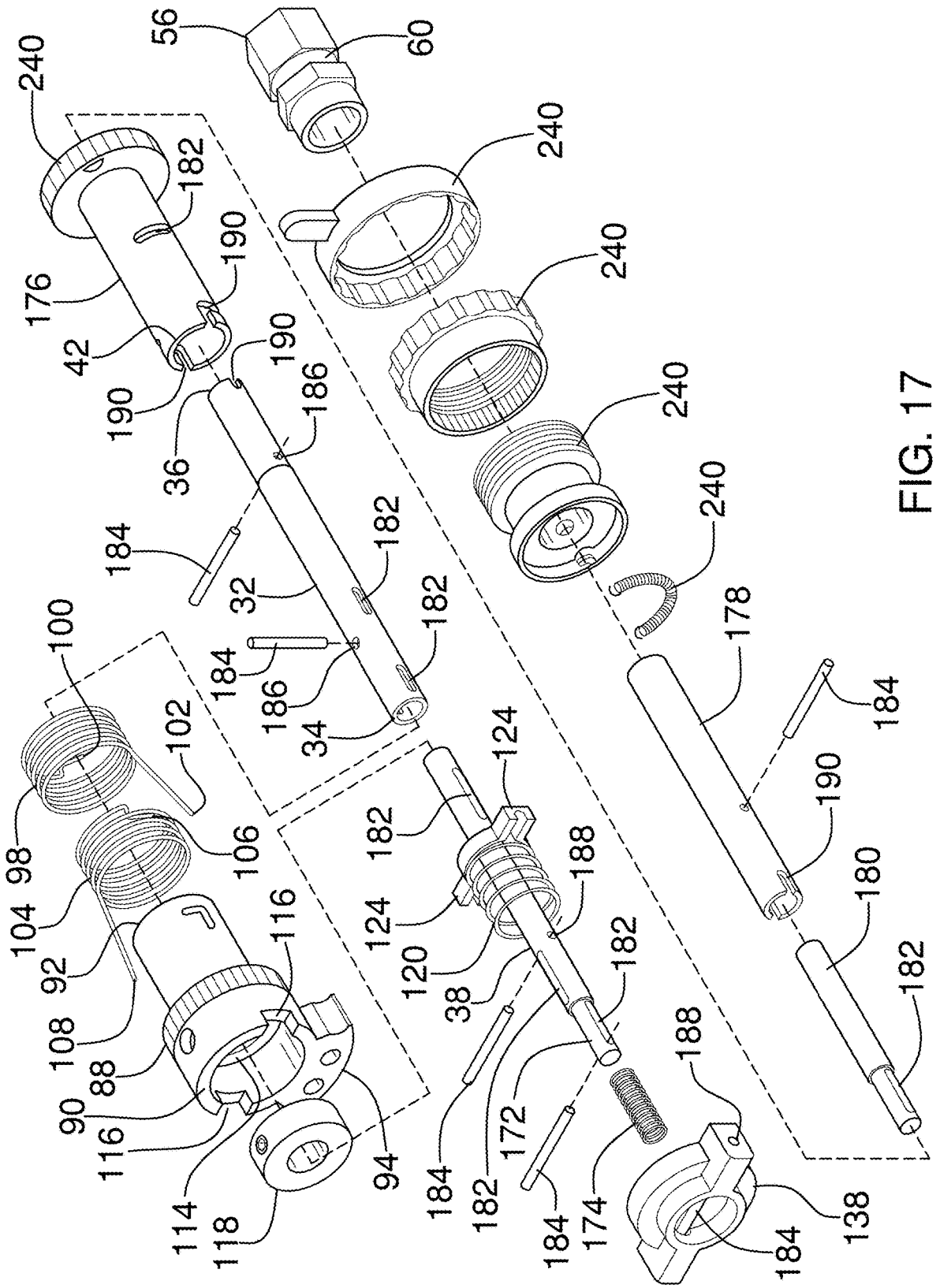
FIG. 17 is an exploded view of an embodiment of the disclosure.
Figure 18:
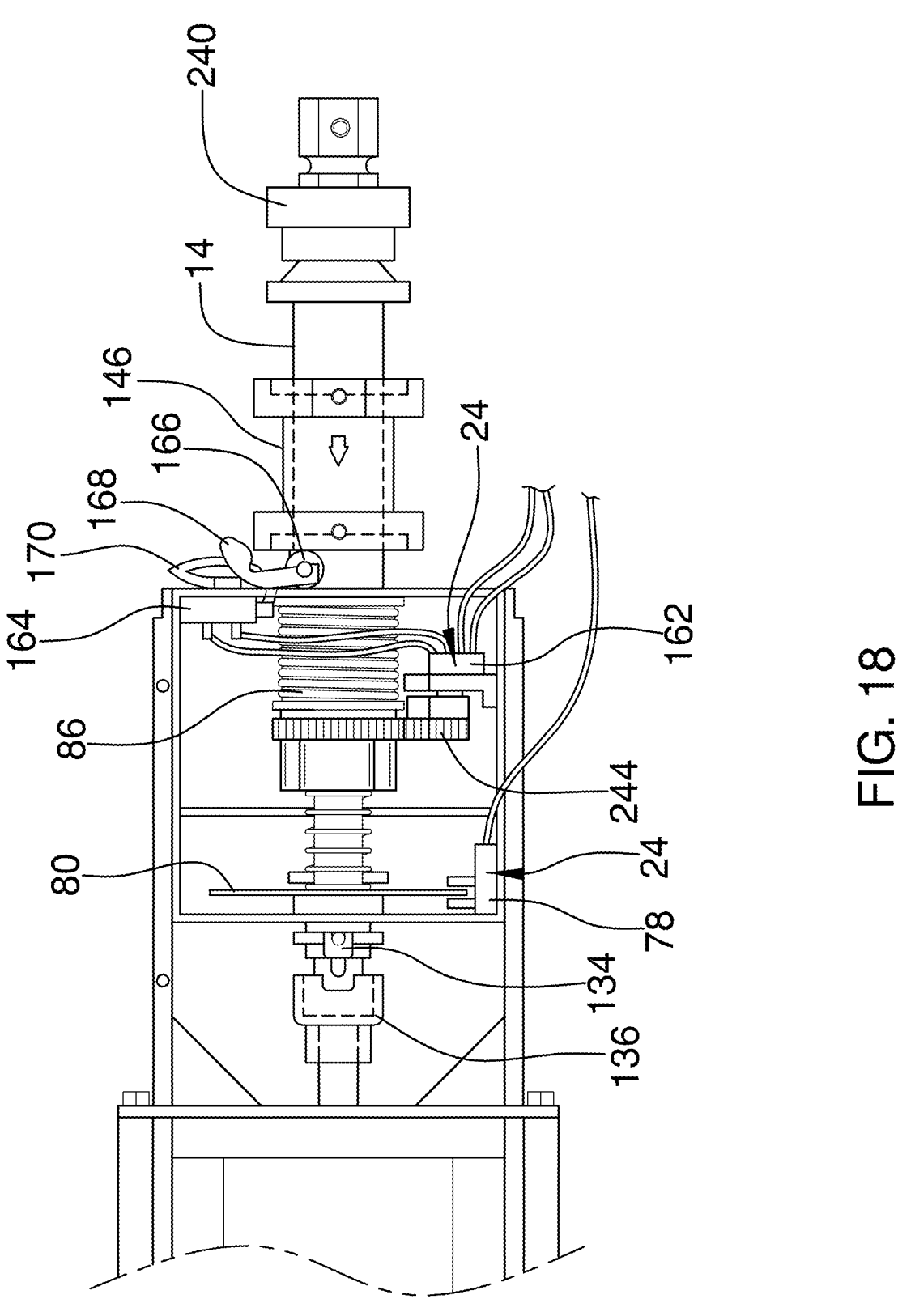
FIG. 18 is a bottom view of an embodiment of the disclosure.

The present invention anticipates the axle assembly 22 and the steering column 14 being of a variety of complementary configurations, which will be apparent to those skilled in the art of mechanical linkage 38 assemblies. A particular example of a complementary configuration is depicted in FIGS. 13-18, with the exploded view depicted in FIG. 17 showing the components that comprise this particular example. As discussed earlier, the axle assembly 22 comprises the pipe 32 having the linkage 38 positioned therein. An extension rod 172 is slidably attached to and is selectively extensible from the linkage 38. The second motor coupler 138 is slidably attached to the extension rod 172, over which a coil spring 174 is positioned.

The steering column 14 includes an outer tube 176, an inner tube 178, and a slotted rod 180, which is positioned within and is slidably engaged to the inner tube 178. Upon attachment of the steering column 14 to the receiving unit 12, the outer tube 176 and the inner tube 178 are positioned partially over and mated to the pipe 32. The slotted rod 180 is selectively extensible from the inner tube 178 to engage the linkage 38 within the pipe 32. The steering column 12 also includes the hub 240 that is used to attach the steering column 14 to the axle assembly 22.

As is shown in FIG. 17, the pipe 32, the linkage 38, the outer tube 176, the slotted rod 180, and the extension rod 172 have slots 182 positioned therein for receiving linkage pins 184 that allow the components to either slide or rotate relative to one another depending on how the slot 182 is positioned in the component. Generally, a linkage pin 184 will pass through a pair of holes 186 (or a channel 188) in one component and a slot 182 in another component. End grooves 190 in the outer tube 176, the inner tube 178, and the pipe 32 are positioned to seat linkage pins 184 to engage the components selectively and operationally.

In operation, selective actuation of the selector 18 a first time induces a first stage compression of the set spring 120 to withdraw the engagement pins 124 from the receiving slots 116 so that the steering column 14 is freely rotatable. As shown in FIG. 14, this corresponds to moving the control knob 142 from a home position wherein the torque generator 86 is active (the first configuration of the linkage 38) to a second position wherein the axle assembly 22 can spin freely (the second configuration of the linkage 38). Selective actuation of the selector 18 a second time induces a second stage compression of the set spring 120 and compression of the coil spring 174 (the third configuration of the linkage 38). This results in the second motor coupler 138 being extended from the linkage 38 to engage the first motor coupler 136, thereby operationally engaging the pipe 32 and the steering column 14 to the force feedback motor 132.

The present invention also anticipates an arcade machine system 192, which comprises an arcade machine 28 and a steering control assembly 10. The arcade machine 28 comprises a cabinet 26 having a top 194, a bottom 196, and a front wall 198. The front wall 198 has a cutout 200 positioned therein that extends from the top 194 toward the bottom 196 of the cabinet 26.

A front panel 202 is hingedly attached to the top 194 of the cabinet 26 and extends downwardly into the cutout 200 in the front wall 198. The front panel 202 is selectively positionable in a stowed configuration, wherein the front panel 202 substantially occupies the cutout 200, and a deployed configuration, wherein the front panel 202 extends angularly from the front wall 198 of the cabinet 26. The front panel 202 has a front face 204 and a rear face 206. The present invention anticipates an actuator (not shown) being attached to the cabinet 26 and operationally engaged to the front panel 202 so that deployment and stowage of the front panel 202 is automated. The actuator may comprise a linear actuator, an electric motor, rack and pinion gears, or the like.

A control unit 40 is attached to and is positioned within the cabinet 26. The control unit 40 is programmed to execute a plurality of video games. A display 208 is attached to and extends upwardly from the top 194 of the cabinet 26. The display 208 is operationally engaged to the control unit 40 and is configured to present video of a respective video game. A speaker 210 is attached to the cabinet 26 and is operationally engaged to the control unit 40. The speaker 210 is configured to broadcast audio of the respective video game. As is shown in FIGS. 1-4, the speaker 210 is one of a pair of speakers 210, although the present invention also anticipates more than two speakers 210, with one speaker 210 potentially comprising a subwoofer.

A plurality of front switches 212 is attached to the front face 204 of the front panel 202 and is communicatively engaged to the control unit 40. The plurality of front switches 212 is configured for entry of commands into the control unit 40. The present invention also anticipates a plurality of top switches 214 being attached to the top 194 of the cabinet 26 and being communicatively engaged to the control unit 40. The plurality of top switches 214 also would be configured for entry of commands into the control unit 40. Such top switches 214 include, for example, joysticks, one and two player selection switches, and the like. The present invention anticipates the plurality of top switches 214 being disabled or optionally disabled when the front panel 202 is extended.

The steering control assembly 10 comprises a receiving unit 12, a steering column 14, a grasp 16, and a selector 18. The receiving unit 12 comprises a housing 20, an axle assembly 22, and an interface 24. The housing 20 is mounted within the cabinet 26 of the arcade machine 28. The axle assembly 22 is attached to and is positioned within the housing 20. The axle assembly 22 comprises a pipe 32, which has a first end 34 and a second end 36, and a linkage 38, which is slidably attached to and positioned within the pipe 32. The linkage 38 corotates with the pipe 32 and is selectively positionable in a first configuration, a second configuration, and a third configuration. In the first configuration (FIG. 14), restricted rotation of the steering column 14 is allowed and the steering column 14 returns to the preset position upon release of the grasp 16. In the second configuration (FIG. 15), unlimited rotation of the steering column 14 is allowed. In the third configuration (FIG. 16) rotation of the steering column 14 is resisted.

The interface 24 is operationally engaged to the axle assembly 22 and is communicatively engaged the control unit 40. The steering column 14 has a first end 42 and a second end 44. The steering column 14 is selectively and operationally engageable to the axle assembly 22 so that rotation of the steering column 14 actuates the interface 24 to signal the control unit 40. As is shown in FIG. 11, the steering column 14 is operationally engaged to the axle assembly 22 by insertion of its first end 42 through a column opening 46 in the cabinet 26. The steering control assembly 10 may include an opening cover 48, which is attachable to the cabinet 26 to close the column opening 46 when not in use.

The grasp 16 is attached to and extends laterally from the second end 44 of the steering column 14 and is configured to be grasped in one or both hands of a user to rotate the steering column 14. The selector 18 is attached to one of the grasp 16 and the steering column 14, is operationally engaged to the axle assembly 22, and is configured to be selectively manipulated by a user to actuate the axle assembly 22 in a respective one of a plurality of steering modes. Each steering mode corresponding to a rotational mode of the steering column 14, wherein rotation of the steering column 14 is either unlimited (free spinning), restricted and biased to return to a preset position upon release of the grasp 16, or resisted.

The arcade machine system 192 also may comprise a shift receiver 216 and a gearshift 218. The shift receiver 216 is attached to the front panel 202 and is communicatively engaged to the control unit 40. The gearshift 218 is selectively attachable to the shift receiver 216 so that the gearshift 218 is operationally engaged to the shift receiver 216. The gearshift 218 is configured to be grasped in a hand of the user to shift into different gears, with each gear corresponding to a respective gearing signal that is sent to the control unit 40. The gearshift 218 is useful in a variety of arcade games wherein the axle assembly 22 is in a respective one of the plurality of steering modes.

The front panel 202 has a shift opening 220 positioned therein with the gearshift 218 being selectively attachable to the shift receiver 216 by insertion through the shift opening 220. The front panel 202 has a plurality of gear slots 222 positioned therein with each gear slot 222 extending from the shift opening 220 to define a slot terminus 224 distal from the shift opening 220. The shift receiver 216 may comprise a plurality of electrical switches 226, which is attached to the rear face 206 of the front panel 202. The plurality of electrical switches 226 are communicatively engaged to the control unit 40. Each electrical switch 226 is positioned adjacent to a respective slot terminus 224 and corresponds to a respective gearing signal to be sent to the control unit 40 upon switching of the electrical switch 226 caused by shifting of the gearshift 218 into a respective gear slot 222. While the gearing shown in FIGS. 2 and 4 corresponds to four gears, the present invention also anticipates three and five or more gears, a user selectable number of gears, a high gear setting, and a low gear setting.

The front wall 198 has a first pedal opening 228 and a second pedal opening 230 positioned therein proximate to the bottom 196 of the cabinet 26. An accelerator pedal 232 and a brake pedal 234 are hingedly attached to the bottom 196 proximate to the front wall 198 and are communicatively engaged to the control unit 40. The accelerator pedal 232 is selectively positionable between a stowed configuration, wherein the accelerator pedal 232 is positioned within the cabinet 26, and a deployed configuration, wherein the accelerator pedal 232 extends from the front wall 198 through the first pedal opening 228. The brake pedal 234 is selectively positionable between a stowed configuration, wherein the brake pedal 234 is positioned within the cabinet 26, and a deployed configuration, wherein the brake pedal 234 extends from the front wall 198 through the second pedal opening 230. The present invention also anticipates the arcade machine system 192 comprises a clutch pedal (not shown), configured as per the brake pedal 234 and positioned to its left, which would have to be depressed to allow shifting of the gearshift 218.

Figure 6:
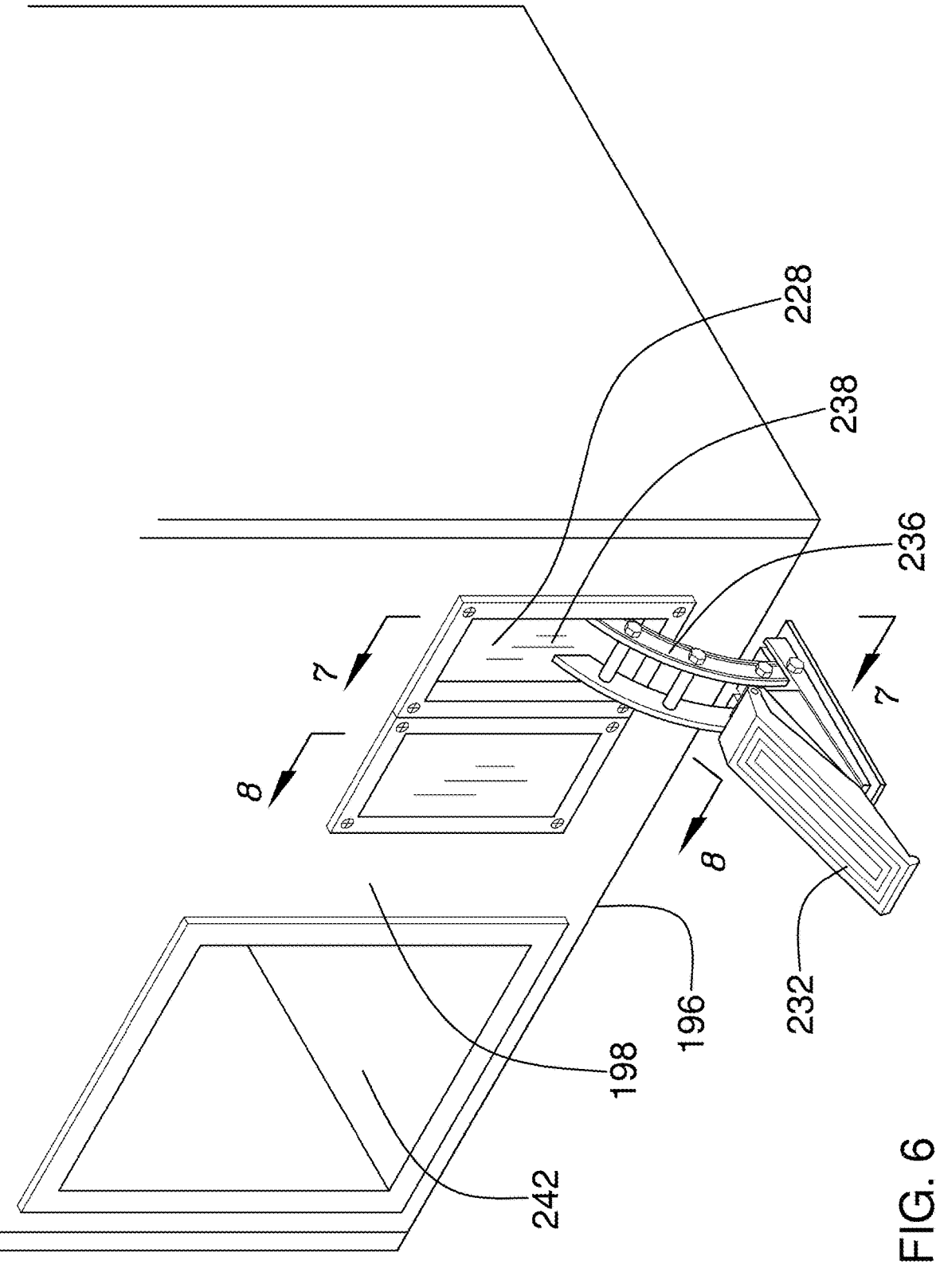
FIG. 6 is a detail view of an embodiment of the disclosure.
Figure 8:
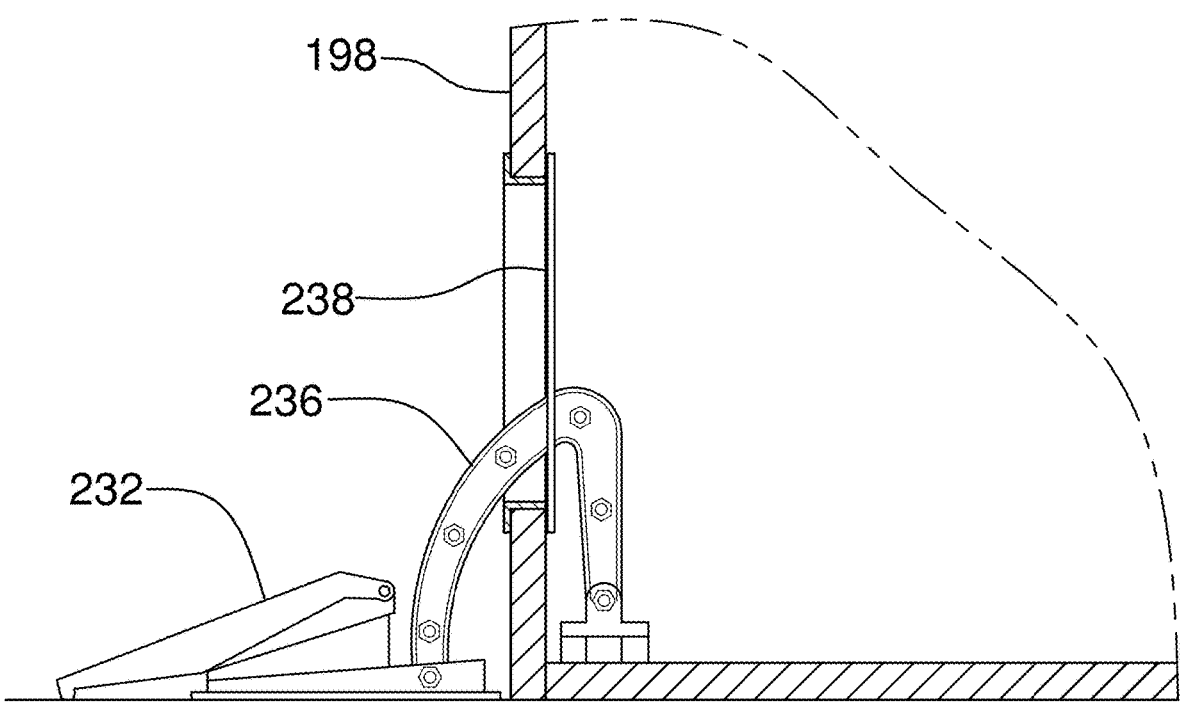
FIG. 8 is a cross-sectional view of an embodiment of the disclosure.
Figure 7:
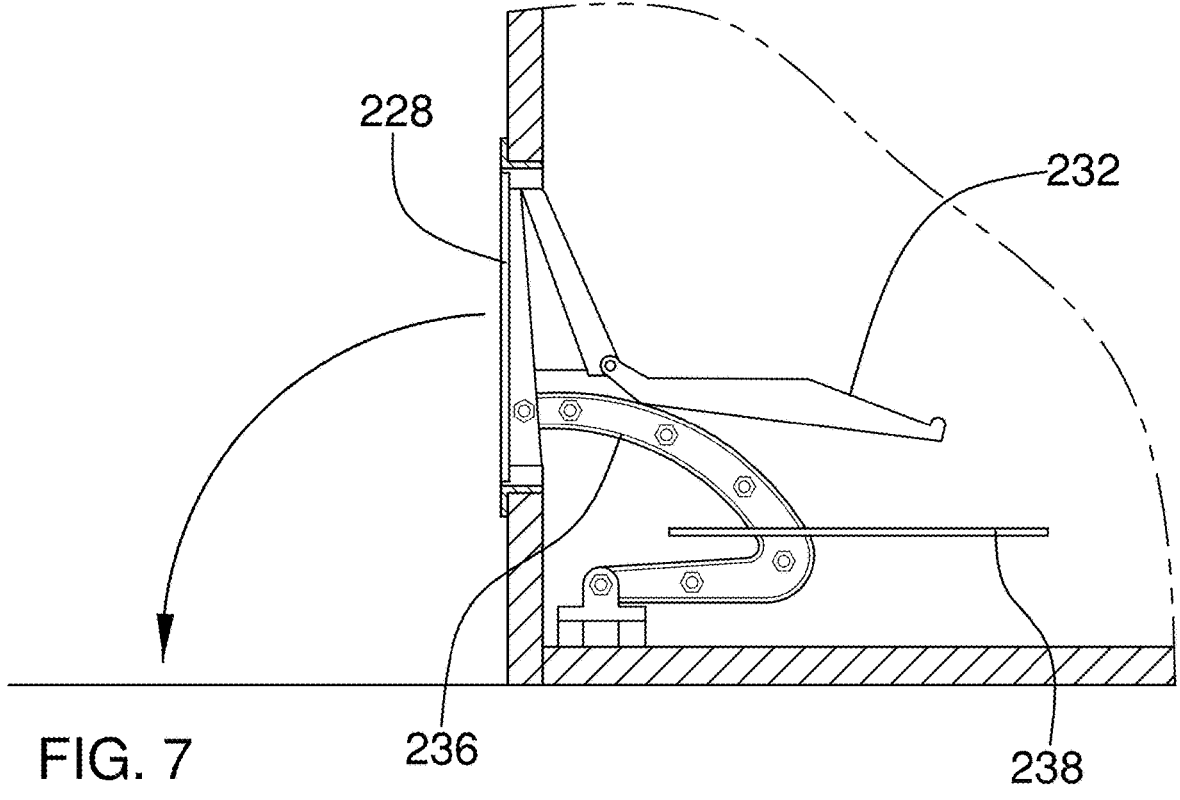
FIG. 7 is a cross-sectional view of an embodiment of the disclosure.

While a variety of configurations allowing for selective deployment of the accelerator pedal 232 and the brake pedal 234 are anticipated by the present invention, one such configuration is shown in detail in FIGS. 6-8. Each of the accelerator pedal 232 and the brake pedal 234 are attached to a respective arcuate arm 236, which in turn is hingedly attached to the bottom 196 of the cabinet 26. Hinging of the arcuate arms 236 positions the accelerator pedal 232 and the brake pedal 234 so that they can be manipulated by a foot of the user. Additionally, cover panels 238 attached to the arcuate arms 236 cover the first pedal opening 228 and the second pedal opening 230 upon deployment of the accelerator pedal 232 and the brake pedal 234, respectively.

Figure 2:
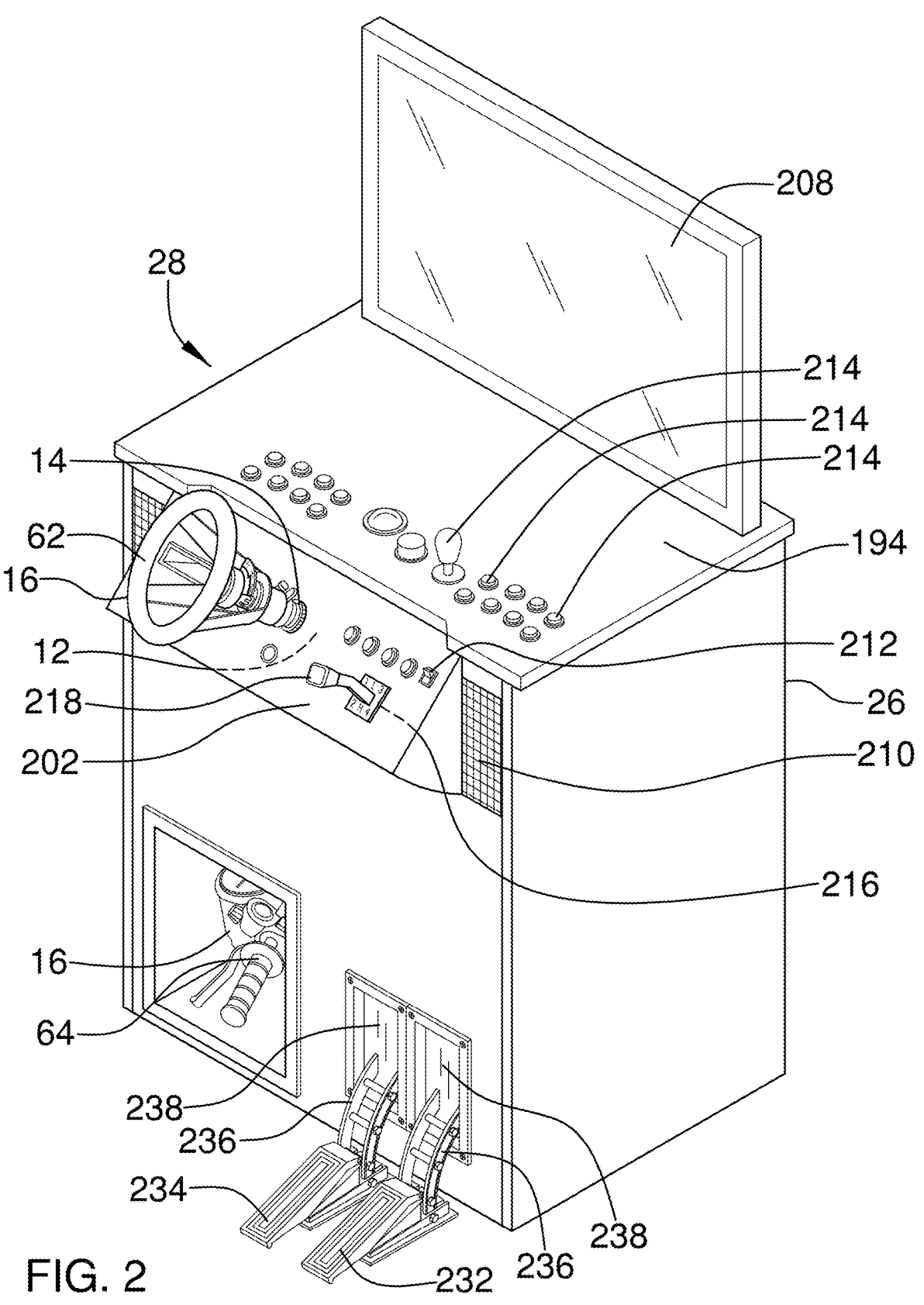
FIG. 2 is an isometric perspective view of an embodiment of the disclosure.
Figure 3:
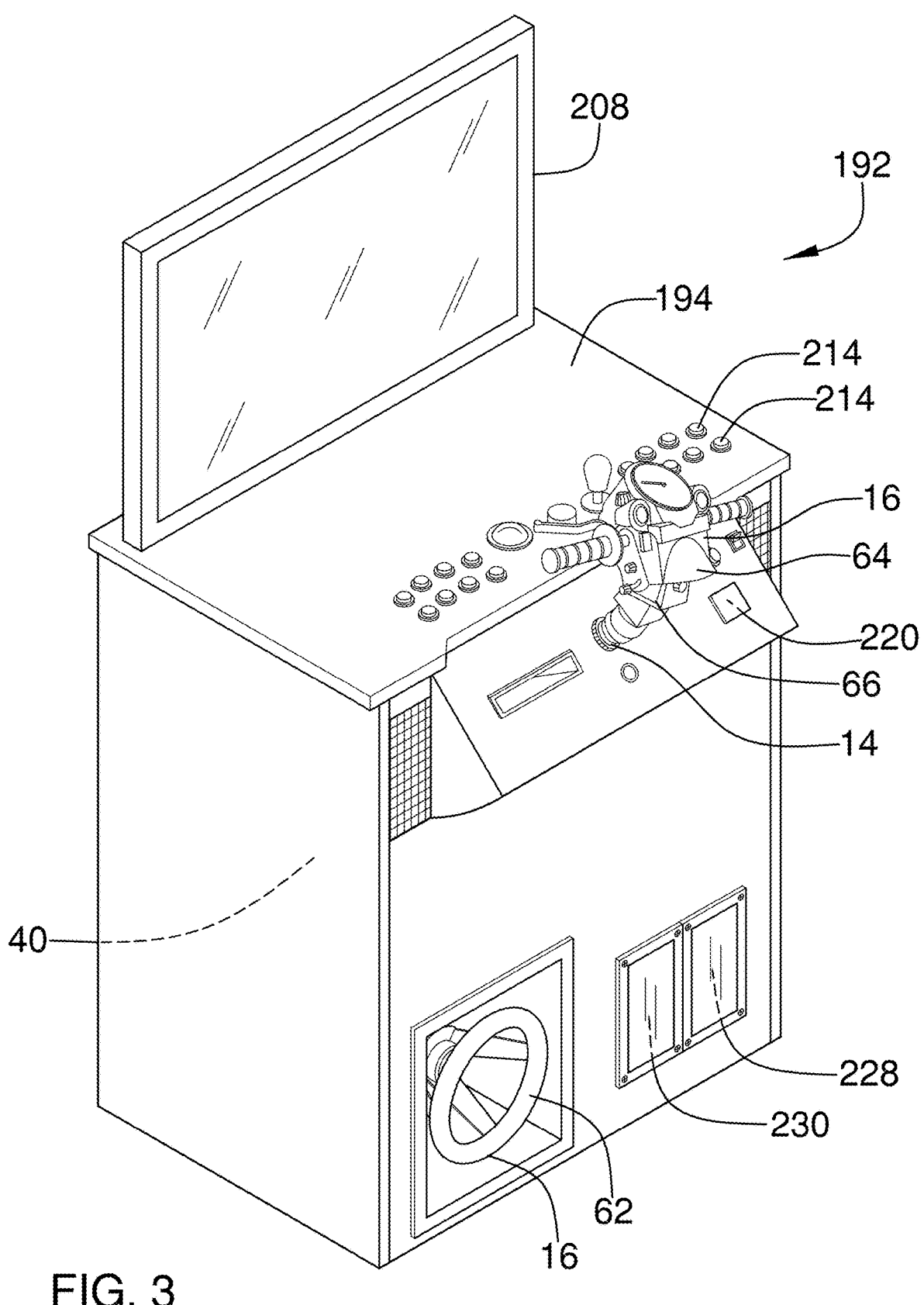
FIG. 3 is an isometric perspective view of an embodiment of the disclosure.
Figure 4:
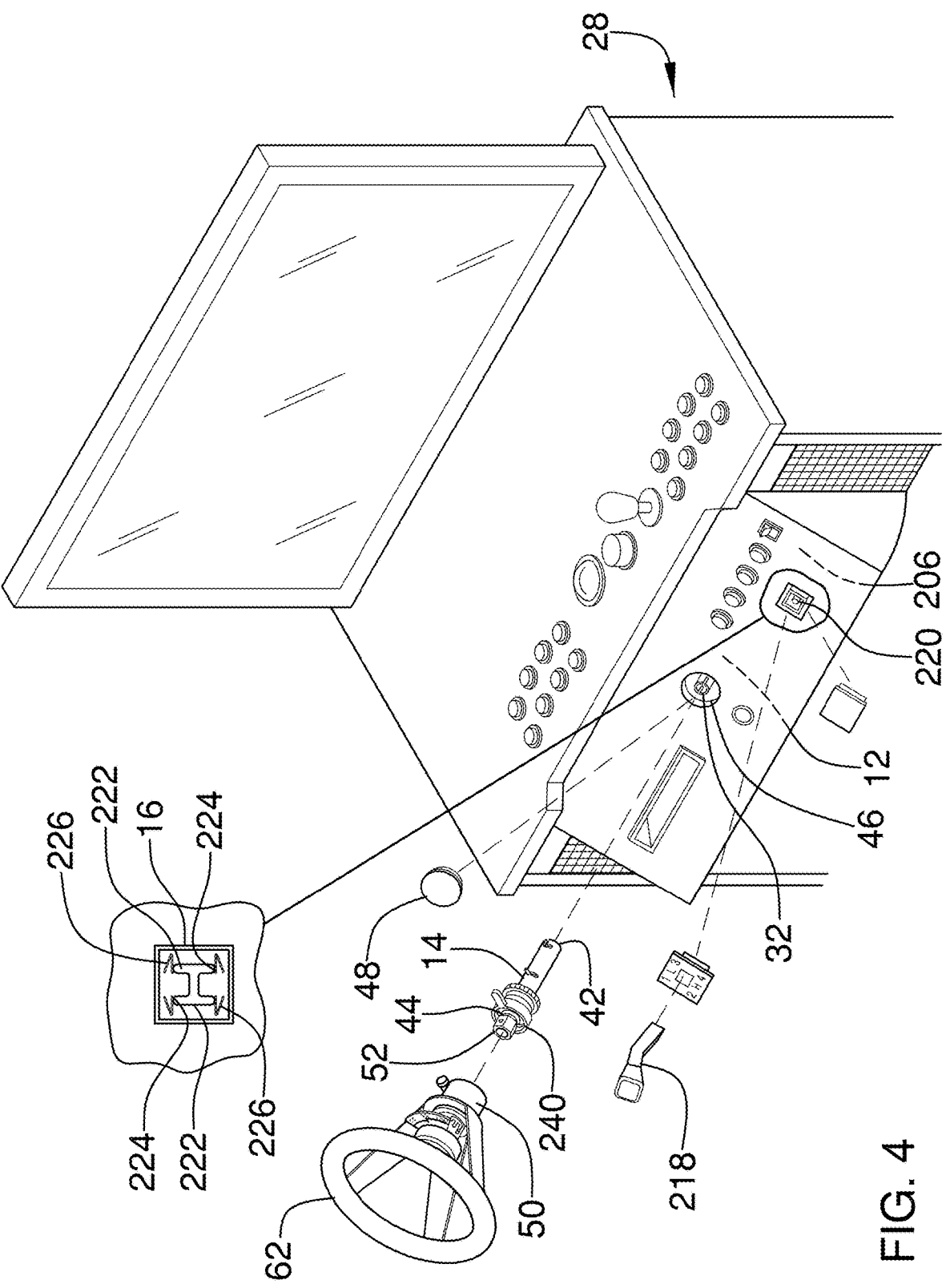
FIG. 4 is a detail view of an embodiment of the disclosure.
Figure 5:
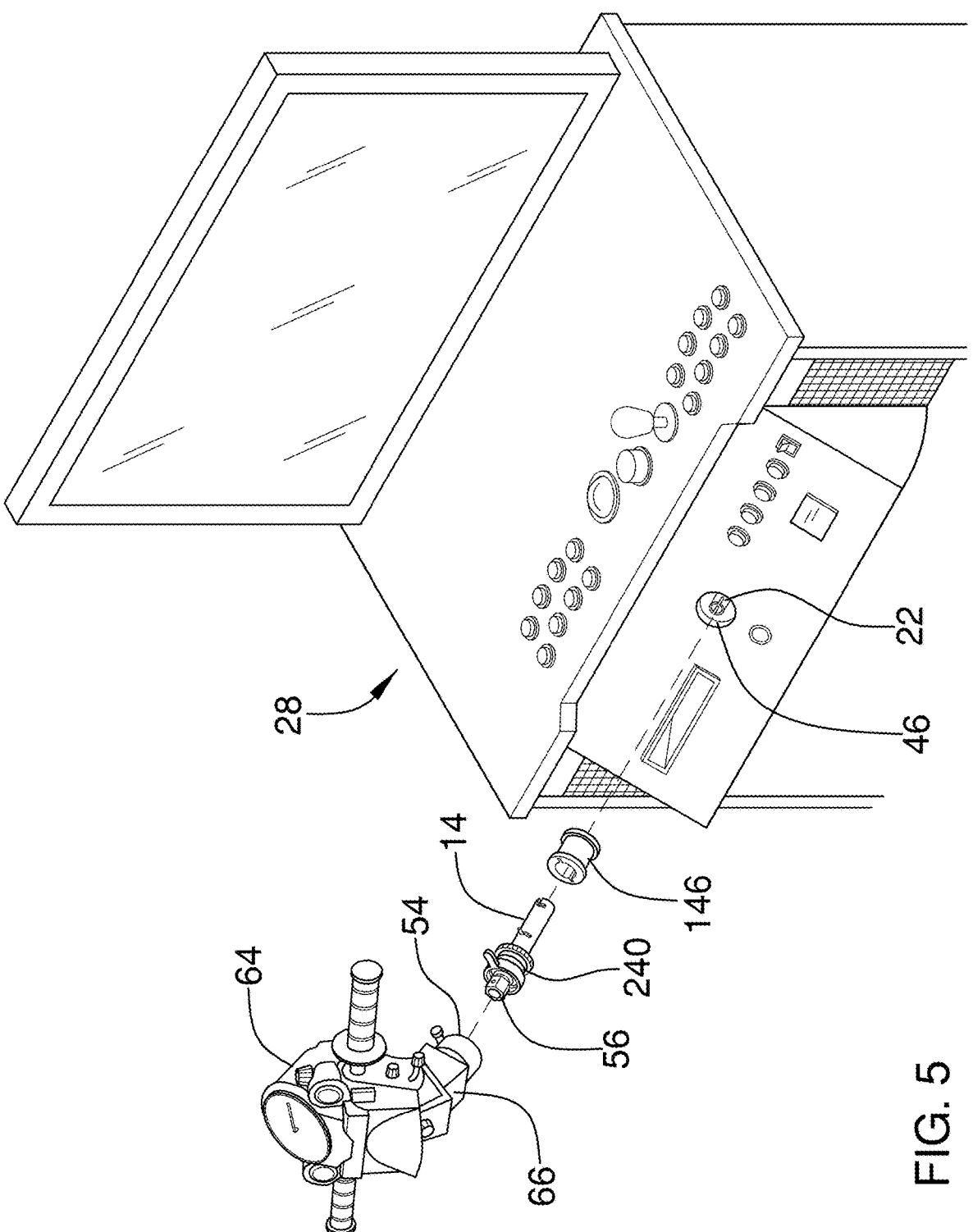
FIG. 5 is a detail view of an embodiment of the disclosure.

As is shown in FIGS. 1-4. The cabinet 26 of the arcade machine 28 has a cubby hole 242 extending thereinto which can be used to stow the steering wheel 62 and the handlebar module 64 when not in use, as is shown in FIG. 2.

In use, the receiving unit 12 is attached to an arcade machine 28 and the interface 24 is communicatively engaged to a control unit 40 of the arcade machine 28. The steering column 14 then is attached to the axle assembly 22 and a grasp 16 appropriate for a desired video game is attached to the steering column 14. The selector 18 then is selectively manipulated by the user to actuate the axle assembly 22 in a respective one of the plurality of steering modes that is appropriate for the desired video game. The user then can play the desired video game.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A steering control assembly for an arcade machine comprising:
   a receiving unit comprising:
      a housing being configured to be mounted within a cabinet of an arcade machine;
      an axle assembly being attached to and positioned within the housing; and
      an interface being operationally engaged to the axle assembly and being configured to communicatively engage a control unit of the arcade machine;
   a steering column having a first end and a second end, the steering column being selectively and operationally engageable to the axle assembly such that rotation of the steering column actuates the interface to signal the control unit;
   a grasp being attached to and extending laterally from the second end of the steering column and being configured for grasping in one or both hands of a user to rotate the steering column; and
   a selector being operationally engaged to the axle assembly and configured to be selectively manipulated by a user to actuate the axle assembly in a respective one of a plurality of steering modes, each steering mode of the plurality of steering modes corresponding to a rotational mode of the steering column, wherein rotation of the steering column is either: unlimited;
      restricted and biased to return to a preset position upon release of the grasp; or
      resisted.

2. The steering control assembly of claim 1, wherein the axle assembly comprises:
   a pipe having a first end and a second end; and
   a linkage slidably attached to and positioned within the pipe such that the linkage corotates with the pipe and such that the linkage is selectively positionable in a first configuration wherein restricted rotation of the steering column is allowed and the steering column returns to the preset position upon release of the grasp, a second configuration wherein unlimited rotation of the steering column is allowed, and a third configuration wherein rotation of the steering column is resisted.

3. The steering control assembly of claim 2, further including:
   a disc being attached to the pipe, the disc have a perimeter and a plurality of slits positioned therein, the plurality of slits extending around the disc proximate to the perimeter; and
   the interface comprising an optical reader, the optical reader being attached to and positioned within the housing, the linkage in the second configuration positioning disc to be read by the optical reader such that a number of slits passing thereby is communicated to the control unit, thereby enabling the control unit to determine a direction of rotation of the pipe and to calculate a number of rotations of the pipe.

4. The steering control assembly of claim 2, further including the axle assembly comprising a torque generator, the torque generator being operationally engaged to the linkage in the first configuration such that the torque generator generates torque upon rotation of the pipe about its longitudinal axis thereby inducing the steering column to return to the preset position upon release of the grasp.

5. The steering control assembly of claim 4, wherein the torque generator comprises:
   a torque sleeve being positioned around the pipe and having a first end and a second end, the torque sleeve being engaged to the linkage in the first configuration such that the torque sleeve corotates with the pipe;
   a stop rod being attached to the housing and extending in parallel with the pipe;
   a protrusion extending radially from the torque sleeve such that the protrusion engages the stop rod upon either clockwise rotation or counterclockwise rotation of the grasp to restrict rotation of the steering column;
   a left torque spring being positioned around the torque sleeve and having a first terminus and a second terminus, the first terminus being attached to the torque sleeve such that, with the torque sleeve engaged to the linkage, the stop rod is positioned to engage the left torque spring proximate to the second terminus to tension the left torque spring upon counterclockwise rotation of the grasp, thereby tensioning the left torque spring and causing the steering column to return the preset position upon release of the grasp; and
   a right torque spring being positioned around the torque sleeve and having a first endpoint and a second endpoint, the first endpoint being attached to the torque sleeve, such that, with the torque sleeve engaged to the linkage, the stop rod is positioned to engage the right torque spring proximate to the second endpoint upon clockwise rotation of the grasp, thereby tensioning the right torque spring and causing the steering column to return the preset position upon release of the grasp.

6. The steering control assembly of claim 5, further including:
   the torque sleeve being circumferentially smaller proximate to the second end than the first end defining a ledge within the torque sleeve, the first end of the torque sleeve having a pair of receiving slots positioned therein;
   a locking collar being attached to the pipe and positioned within the torque sleeve such that the locking collar abuts the ledge and limits movement of the torque sleeve along the pipe while allowing the locking collar and the pipe to rotate within the torque sleeve in the second configuration and the third configuration;

a set spring being positioned around the pipe proximate to a rear of the housing, the set spring being operationally engaged to the linkage such that the set spring is in a nontensioned state in the first configuration; and a pair of engagement pins being attached to and extending bilaterally from the set spring distal from the rear of the housing, the pair of engagement pins being positioned within the receiving slots with the linkage in the first configuration, such that the torque sleeve is operationally engaged to the pipe and wherein the steering column is biased to return to a preset position upon release of the grasp.

7. The steering control assembly of claim 5, further including:

the torque sleeve comprising a cogwheel;

the interface comprising a potentiometer; and a drive gear being gearedly engaged to the cogwheel and operationally engaged to the potentiometer, such that, with the linkage in the first configuration, the cogwheel rotates the drive gear and the potentiometer generates a voltage reading corresponding to a degree of rotation of the steering column that is communicated to the control unit of the arcade machine.

8. The steering control assembly of claim 2, further including the receiving unit comprising:

a force feedback motor having a shaft and being mounted to the housing such that the shaft is colinear with the pipe;

a first motor coupler being attached to the shaft; and a second motor coupler being attached to the linkage such that, with the linkage in the third configuration, the second motor coupler engages the first motor coupler to operationally engage the pipe to the force feedback motor, whereby rotation of the pipe and the steering column are resisted at a user selectable level.

9. The steering control assembly of claim 1, further including:

the grasp comprising a first coupler, the first coupler being complementary to a second coupler attached to the second end of the steering column, such that the first coupler is selectively couplable to the second coupler to removably attach the grasp to the steering column; and the grasp being one of a plurality of grasps, each grasp of the plurality of grasps having a configuration mimicking a steering element of a respective vehicle, such that the plurality of grasps comprises grasps having configurations mimicking steering elements of a variety of vehicles.

10. The steering control assembly of claim 9, wherein the plurality of grasps comprises:

a steering wheel selectively attachable to second end of the steering column; and a handlebar module selectively attachable to the steering column, such that the handlebar module extends bilaterally from the second end of the steering column, the handlebar module comprising a pivot joint proximate to the second end of the steering column, such that the handlebar module is selectively pivotable vertically and horizontally relative to the steering column.

11. The steering control assembly of claim 2, further including:

the grasp having a set of three cam slots positioned therein; and the selector comprising:

a control knob being attached to the grasp and operationally engaged to the linkage upon attachment of the grasp to the steering column, the control knob being spring loaded; and a pin being attached to and extending from the control knob, such that pushing the control knob allows alignment of the pin with a respective cam slot of the set of three cam slots and, upon release of the control know, the pin locks into the respective cam slot thereby positioning the linkage in an associated one of the first configuration, the second configuration, and the third configuration of the linkage.

12. The steering control assembly of claim 5, further including a rotation limiter being selectively attachable to the steering column, such that the rotation limiter operationally engages the axle assembly upon attachment of the steering column to the pipe.

13. The steering control assembly of claim 12, further including:

a stop knob attached externally to and extending from the front of the housing; and the rotation limiter comprising:

a tube having a first terminus and a second terminus, the tube being selectively positionable over the first end of the steering column, such that the first terminus of the tube is positioned adjacent to the first end; and a stop ring attached to and extending radially from first end of the tube, the stop ring having a void positioned therein, such that the stop knob is positioned in the void upon insertion of the steering column into the column opening, wherein rotation of the steering column is restricted by contact of the stop knob with opposed edges of the void.

14. The steering control assembly of claim 12, further including:

the torque sleeve comprising a cogwheel;

the interface comprising a three-terminal resistor; and a cog gear being gearedly engaged to the cogwheel and operationally engaged to the three-terminal resistor, such that, with the rotation limiter is engaged, the cogwheel rotates the cog gear and the three-terminal resistor generates a voltage reading corresponding to a degree of rotation of the steering column that is communicated to the control unit of the arcade machine.

15. The steering control assembly of claim 5, further including:

the torque sleeve comprising a cogwheel;

the interface comprising a potentiometer and a three-terminal resistor;

a drive gear being gearedly engaged to the cogwheel and operationally engaged to the potentiometer;

a cog gear being gearedly engaged to the cogwheel and operationally engaged to the three-terminal resistor; and a mode switch being attached to the housing and operationally engaged to the potentiometer and the three-terminal resistor for selectively changing the source of the output of the interface between the potentiometer and the three-terminal resistor.

16. An arcade machine system comprising:

an arcade machine comprising:

a cabinet having a top, a bottom, and a front wall, the front wall having a cutout positioned therein, the cutout extending from the top toward the bottom of the cabinet;

a front panel having a front face and a rear face, the front panel being hingedly attached to the top of the cabinet and extending downwardly into the cutout in a front wall of the cabinet, such that the front panel is selectively positionable in a stowed configuration, wherein the front panel substantially occupies the cutout, and a deployed configuration, wherein the front panel extends angularly from the front wall of the cabinet;

a control unit attached to and positioned within the cabinet, the control unit being programmed to execute a plurality of video games;

a display attached to and extending upwardly from the top of the cabinet, the display being operationally engaged to the control unit, wherein the display is configured to present video of a respective video game;

a speaker attached to the cabinet and being operationally engaged to the control unit, wherein the speaker is configured to broadcast audio of the respective video game;

a plurality of front switches attached to the front face of the front panel and being communicatively engaged to the control unit, wherein the plurality of front switches is configured for entry of commands into the control unit; and a steering control assembly comprising:
  a receiving unit comprising:
    a housing being mounted within the cabinet;
    an axle assembly being attached to and positioned within the housing, the axle assembly comprising:
      a pipe having a first end and a second end; and
      a linkage slidably attached to and positioned within the pipe such that the linkage corotates with the pipe and such that the linkage is selectively positionable in a first configuration wherein restricted rotation of the steering column is allowed and the steering column returns to the preset position upon release of the grasp, a second configuration wherein unlimited rotation of the steering column is allowed, and a third configuration wherein rotation of the steering column is resisted; and
    an interface being operationally engaged to the axle assembly and being communicatively engaged to the control unit;
  a steering column having a first end and a second end, the steering column being selectively and operationally engageable to the axle assembly, such that rotation of the steering column actuates the interface to signal the control unit;
  a grasp being attached to and extending laterally from the second end of the steering column and being configured for grasping in one or both hands of a user to rotate the steering column; and
  a selector being attached to one of the grasp and the steering column, operationally engaged to the axle assembly, and configured to be selectively manipulated by a user to actuate the axle assembly in a respective one of a plurality of steering modes, each steering mode of the plurality of steering modes corresponding to a rotational mode of the steering column, wherein rotation of the steering column is either:
    unlimited;

16 restricted and biased to return to a preset position upon release of the grasp; or
    resisted.

17. The arcade machine system of claim 16, further including:
  the receiving unit comprising:
    a force feedback motor having a shaft and being mounted to the housing such that the shaft is colinear with the pipe;
    a first motor coupler being attached to the shaft; and
    a second motor coupler being attached to the linkage such that, with the linkage in the third configuration, the second motor coupler engages the first motor coupler to operationally engage the pipe to the force feedback motor, whereby rotation of the pipe and the steering column are resisted at a user selectable level;
  a shift receiver attached to the front panel and communicatively engaged to the control unit; and
  a gearshift selectively attachable to the shift receiver, such that the gearshift is operationally engaged to the shift receiver, wherein the gearshift is configured to be grasped in a hand of the user to shift into different gears, with each gear corresponding to a respective gearing signal being sent to the control unit.

18. The arcade machine system of claim 17, further including:
  the front wall having a first pedal opening and a second pedal opening positioned therein proximate to the bottom of the cabinet;
  an accelerator pedal being hingedly attached to the bottom proximate to the front wall, the accelerator pedal being communicatively engaged to the control unit, the accelerator pedal being selectively positionable between a stowed configuration, wherein the accelerator pedal is positioned within the cabinet, and a deployed configuration, wherein the accelerator pedal extends from the front wall through the first pedal opening; and
  a brake pedal being hingedly attached to the bottom of the cabinet proximate to the front wall, the brake pedal being communicatively engaged to the control unit, the brake pedal being selectively positionable between a stowed configuration, wherein the brake pedal is positioned within the cabinet, and a deployed configuration, wherein the brake pedal extends from the front wall through the second pedal opening.

19. The arcade machine system of claim 17, further including:
  the front panel having a shift opening positioned therein, the gearshift being selectively attachable to the shift receiver by insertion through the shift opening;
  the front panel having a plurality of gear slots positioned therein, each gear slot extending from the shift opening to define a slot terminus distal from the shift opening; and
  the shift receiver comprising a plurality of electrical switches attached to the rear face of the front panel, the plurality of electrical switches being communicatively engaged to the control unit, each electrical switch of the plurality of electrical switches being positioned adjacent to a respective slot terminus and corresponding to a respective gearing signal to be sent to the control unit upon switching of the electrical switch caused by shifting of the gearshift into a respective gear slot.

* * * * *